United States Patent
Wooten

(10) Patent No.: US 9,772,754 B2
(45) Date of Patent: Sep. 26, 2017

(54) COLLABORATIVE NETWORK-BASED GRAPHICAL PROGRESS MANAGEMENT TOOL

(71) Applicant: Progressly, Inc., Palo Alto, CA (US)

(72) Inventor: Clarence Wooten, Palo Alto, TX (US)

(73) Assignee: PROGRESSLY, INC., Redwood City, CA (US)

( * ) Notice: Subject to any disclaimer, the term of this patent is extended or adjusted under 35 U.S.C. 154(b) by 927 days.

(21) Appl. No.: 14/137,871

(22) Filed: Dec. 20, 2013

(65) Prior Publication Data

US 2015/0007058 A1    Jan. 1, 2015

Related U.S. Application Data

(60) Provisional application No. 61/840,140, filed on Jun. 27, 2013.

(51) Int. Cl.
G06F 3/048        (2013.01)
G06F 3/0484       (2013.01)
H04L 29/06        (2006.01)
G06Q 10/10        (2012.01)

(52) U.S. Cl.
CPC ....... *G06F 3/04842* (2013.01); *G06Q 10/101* (2013.01); *H04L 67/38* (2013.01)

(58) Field of Classification Search
CPC .......................... G06F 15/18; G06F 17/30867
See application file for complete search history.

(56) References Cited

U.S. PATENT DOCUMENTS

| | | | |
|---|---|---|---|
| 2003/0033205 A1* | 2/2003 | Nowers ................. | G06Q 30/06 705/26.2 |
| 2005/0021766 A1* | 1/2005 | McKeowen ............ | H04L 12/24 709/228 |
| 2005/0131750 A1* | 6/2005 | Kogan ................... | G06Q 10/06 705/7.15 |
| 2007/0133607 A1* | 6/2007 | Park .................... | H04N 21/4147 370/484 |
| 2007/0143736 A1* | 6/2007 | Moriarty ............... | G06Q 10/06 717/100 |
| 2008/0162248 A1* | 7/2008 | Vachon ................. | G06Q 10/06 705/7.13 |
| 2008/0243902 A1* | 10/2008 | Rong ..................... | G06Q 10/06 |
| 2009/0064143 A1* | 3/2009 | Bhogal .................. | G06F 9/542 718/100 |
| 2009/0113329 A1* | 4/2009 | Corona .................... | G06F 8/34 715/769 |

(Continued)

*Primary Examiner* — William Bashore
*Assistant Examiner* — Rayeez Chowdhury
(74) *Attorney, Agent, or Firm* — Blakely, Sokoloff, Taylor & Zafman, LLP

(57) ABSTRACT

A network-based graphical progress management tool generates information for providing a graphical user interface to a plurality of users using a plurality of processing devices on a network, to enable a user to create a graphical representation of a process, and to enable the plurality of users to view and edit the graphical representation of the process collaboratively via the network. The tool further receives, from at least one of the plurality of users, user input specifying progress made in performance of the process, and updates the graphical representation to indicate the progress visually, in response to the user input.

23 Claims, 21 Drawing Sheets

(56) References Cited

U.S. PATENT DOCUMENTS

| | | | |
|---|---|---|---|
| 2009/0252063 A1* | 10/2009 | Owen | H04L 12/2807 370/255 |
| 2010/0131289 A1* | 5/2010 | Brandt | G06F 8/34 705/2 |
| 2011/0179371 A1* | 7/2011 | Kopycinski | G06Q 10/10 715/772 |

* cited by examiner

COLLABORATIVE NETWORK-BASED GRAPHICAL PROGRESS MANAGEMENT TOOL

This application claims the benefit of U.S. Provisional Patent application No. 61/840,140, filed on Jun. 27, 2013, which is incorporated herein by reference in its entirety.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

At least one embodiment of the present invention pertains to techniques for tracking progress by one or more individuals in a multi-step process and, more particularly, to a network-based, collaborative, graphical progress management tool for tracking progress by one or more individuals in a multi-step process.

BACKGROUND

In today's busy work environment, a person can become overwhelmed by having to attend numerous meetings and keep track of many projects at the same time. As demands upon a person's time increase, personal efficiency tends to decrease. If a person fails to meet a commitment at work due to forgetfulness or being overloaded with work, this affects coworkers and may cause them to miss commitments or otherwise lose efficiency. This cascade effect can adversely impact the profitability of an entire business.

BRIEF DESCRIPTION OF THE DRAWINGS

One or more embodiments of the present invention are illustrated by way of example and not limitation in the figures of the accompanying drawings, in which like references indicate similar elements.

FIG. 2 shows an example of the Progress Dashboard.

DETAILED DESCRIPTION

Figure 1:
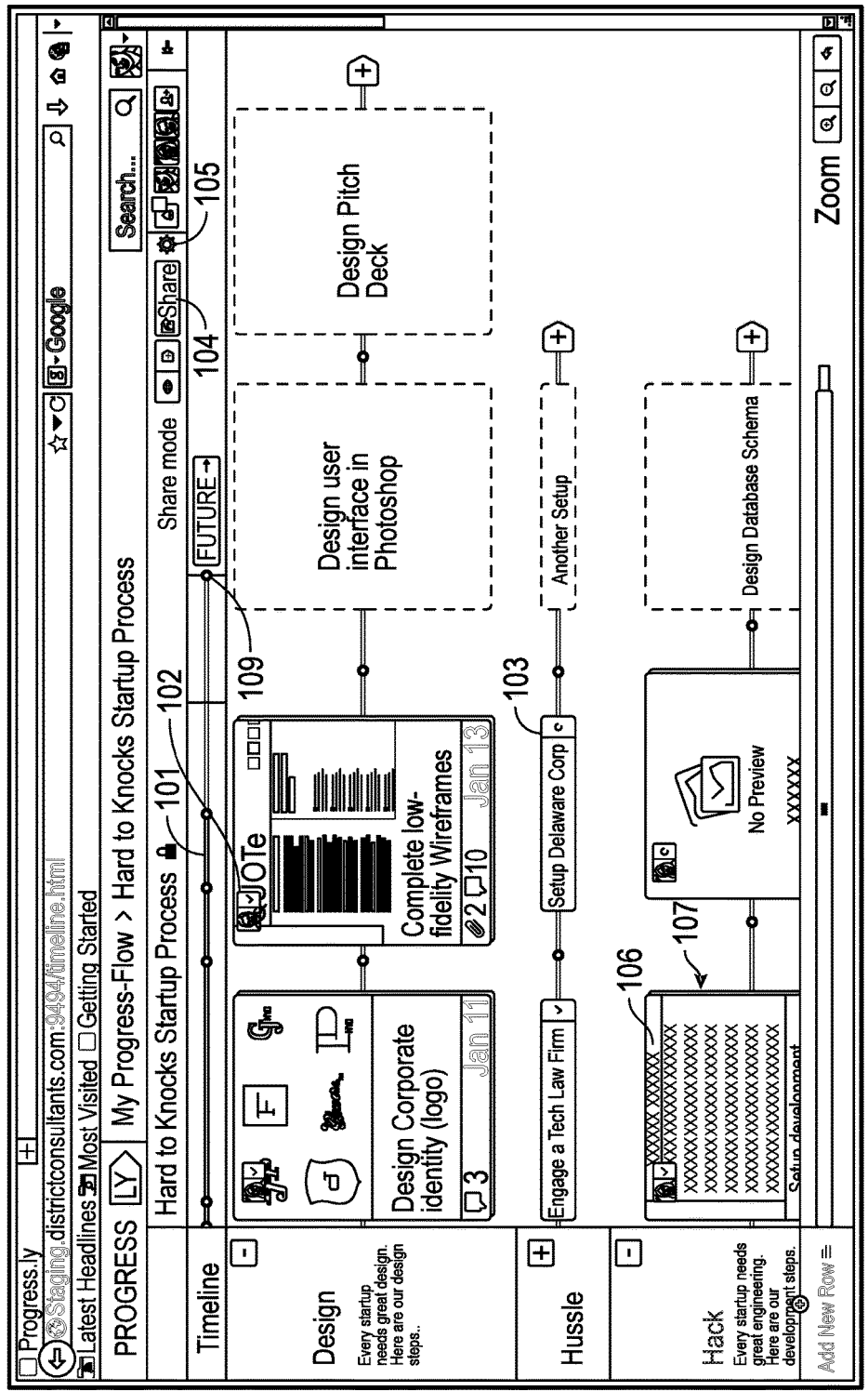
FIG. 1 shows an example of a progress flow.

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, such references are not necessarily mutually exclusive either.

Introduced herein is a progress management tool that combines project management, process management and client communication into (in some embodiments) a cloud-based software application, that makes it easy for professionals to turn any project or process into a visual workflow, called a "progress flow," that communicates progress and keeps team members and stakeholders informed, aligned and on-task. A progress flow is a visual process flow (i.e. a visual representation of a multi-step process) that provides an indication of progress made in performance of the process. Progress flows make progress visual and transparent, freeing up professionals from having to explain progress on various projects, so that they can spend more time making progress. The technique and apparatus introduced here are collectively called "the tool" to facilitate description. The tool accomplishes this by enabling users to graphically and collaboratively create, edit, share and comment on progress flows.

Progress flows are built by using a unique graphical user interface (GUI), provided by the tool, that communicates progress and process via a visual collaborative timeline. A progress flow visually represents a process as well as progress made in that process, in a single visual representation. It includes a "timeline-based" to-do list (e.g., step boxes) with built in "how-to" instructions and other resources. When "how-to" instructions are included within the steps of a progress flow, the progress flow doubles as a step-by-step process roadmap that can be cloned and even published for purchase by users seeking to execute an existing best-practice workflow.

When progress is made, the collaborator updates a step box of a progress flow to show progress by inserting assets (e.g., by dragging and dropping) such as images, documents, videos or web links from sources such as the collaborator's desktop, mobile device, uniform resource locator (URL), cloud storage providers or other web services. The resulting progress transforms the step box into a visual representation that displays and archives what progress was made, when it was made, who made it, and where the assets are. A progress flow can also be embedded in other Web based content, such as blog posts, web pages and other applications that support HTML.

The tool can be implemented by using a conventional client-server model, which can support desktop clients as well as mobile clients. The server side may be implemented by, for example, one or more server-class computers and data storage devices. The client devices may include, for example, desktop computers, laptop or notebook computers, tablet devices, smartphones, and other types of devices.

Conventional hardware can be used on both the server side and the client side to support software that provides the functionality introduced herein. For example, in one embodiment, the client only needs conventional hardware and a conventional software-implemented web browser to access the tool functionality, which is mostly implemented by software and data on the server side.

FIGS. 1 through 13 illustrate examples of display screens that may be presented by the tool user interface on the client side, according to at least one embodiment. The display elements may be generated on the server side and sent to the client, or they may be generated at the client devices, or a combination of both approaches may be used.

FIG. 1 shows an example of a progress flow that was previously created by a user and that is in use. The tool's GUI enables a user to graphically create or modify a timeline from this display screen. The timeline 101 is divided into two parts—the past and the future. A point 109 represents the present point in time (e.g., current date, or current date and time) and is the dividing point between the past and future parts of the timeline. The past part of the timeline (i.e., the part to the left of the current date) displays steps on which progress has been made (i.e., steps that are either in-progress or have been completed). Progress can be represented by a visual. The future side of the timeline (the part to the right of the current date) displays steps on which progress has not been made (therefore their boxes are empty). In some embodiments, the GUI spaces out the steps along the future side of the timeline based on the amounts of time between their user-specified "Progress by" dates, and spaces out the steps on which progress has been made on the left side of the display according to the amounts of time elapsed between their completion dates. In some embodiments, hovering the mouse pointer over the junction between any two step boxes causes the GUI to display elapsed amount of time between their completion dates or specified "Progress by" dates (whichever is applicable).

The example display in FIG. 1. shows progress by transforming and moving dash-outlined step boxes that originate on the right side of the timeline (the future timeline) into solid boxes (in-progress or completed steps) that include a visual representation of the progress that was made. All steps that show progress appear on the left side of the timeline (the past timeline), i.e., to the left of the present point in time 109. In addition or as an alternative to point 109 indicating the present point in time, other types of indicators may be used to indicate visually the difference between past and future on the display, such as a vertical line separating the steps that on which progress has been made (left side) from the steps on which no progress has been made (right side). So when progress is made, one or more uncompleted, dashed, instructional steps, become in-progress or completed, solid, visual steps. FIG. 1 shows an example that includes a combination of completed and in-progress steps (represented on the past/left side of the timeline) and future, not started steps (represented by dashed, blank boxes on the future/right side of the timeline). The GUI can provide multiple rows of step boxes as a way to organize steps by type or responsible party. Such a visual also can show steps that are being performed in parallel.

In the illustrated embodiment, completed steps are shown with a checkmark 102 to indicate that they have been completed. Steps that are in-progress (i.e., in which some progress has been made) are shown with an arrow-in-circle (circular arrow) 103 to indicate that some progress has been made but the step is not complete. FIG. 1 shows the step boxes in an expanded form. Any step box can also be collapsed so as not to show its details but to display only an indication of its status, such as a checkmark to show completed or a circular arrow to show in-progress.

Roles and permissions can be assigned to progress flows created using the tool. Each progress flow typically has up to four roles associated with it, including one or more of the following:

1) Owner—The individual or organization who owns the account under which the progress flow was created.

2) Collaborator with administrative rights—A person who can invite other Collaborators, add rows, add steps to any row, lock the progress flow so that it cannot be shared with Observers, invite Observers, assign steps and due dates to other Collaborators (read access).

3) Collaborator with row-only rights—A person who can add steps to the row(s) in which they have been assigned, can assign steps and due dates to other Collaborators who have access to their row, can view all other rows as an Observer.

4) Observer—A person who can view the entire progress flow but who only has read access. Observers can be granted comment privileges so that they can comment on the progress of any step. In some embodiments, Observers may not be granted access to instructions or resources steps of a progress flow. Selected steps may also be made invisible (e.g., by a Collaborator) to Observers.

Figure 2:
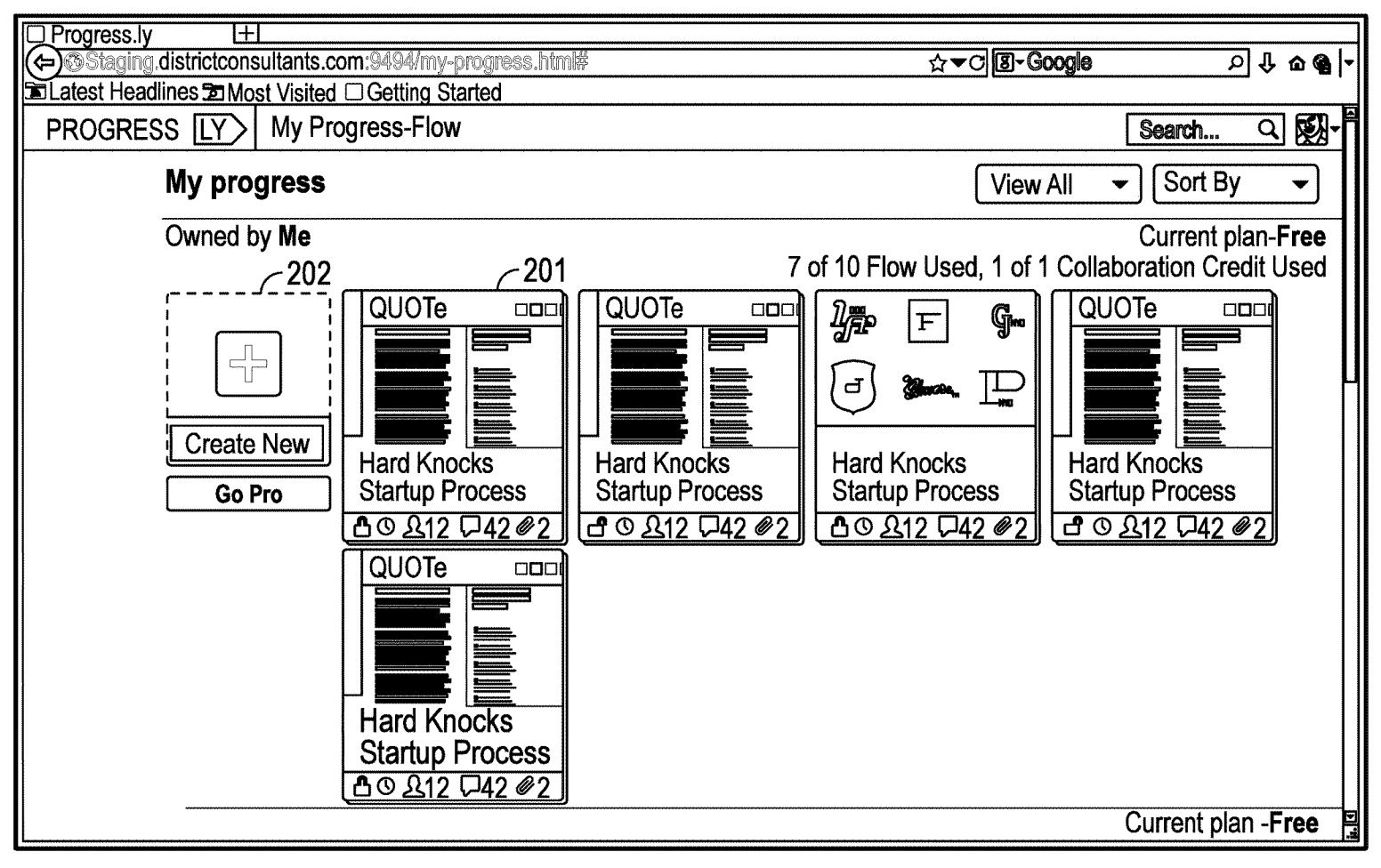

FIG. 2 shows an example of the Progress Dashboard, which displays all progress flows to which the user has access. In one embodiment each progress flow is represented in the Progress Dashboard as a box, such as box 201, which includes the name of the progress flow, its locked/unlocked status, number of comments, etc. In one embodiment, the Progress Dashboard visually divides the progress flows by the following three categories: 1) progress flows owned by the user, 2) progress flows owned by an organization, and 3) progress flows owned by others. Progress flows owned by others are progress flows that are owned by other individuals that have invited the user to collaborate with them on a progress flow; however, since the user is not the owner of these progress flows, the user does not have the ability to clone or use them as a template when creating new progress flows based on the same steps, in at least one embodiment.

Figure 3:
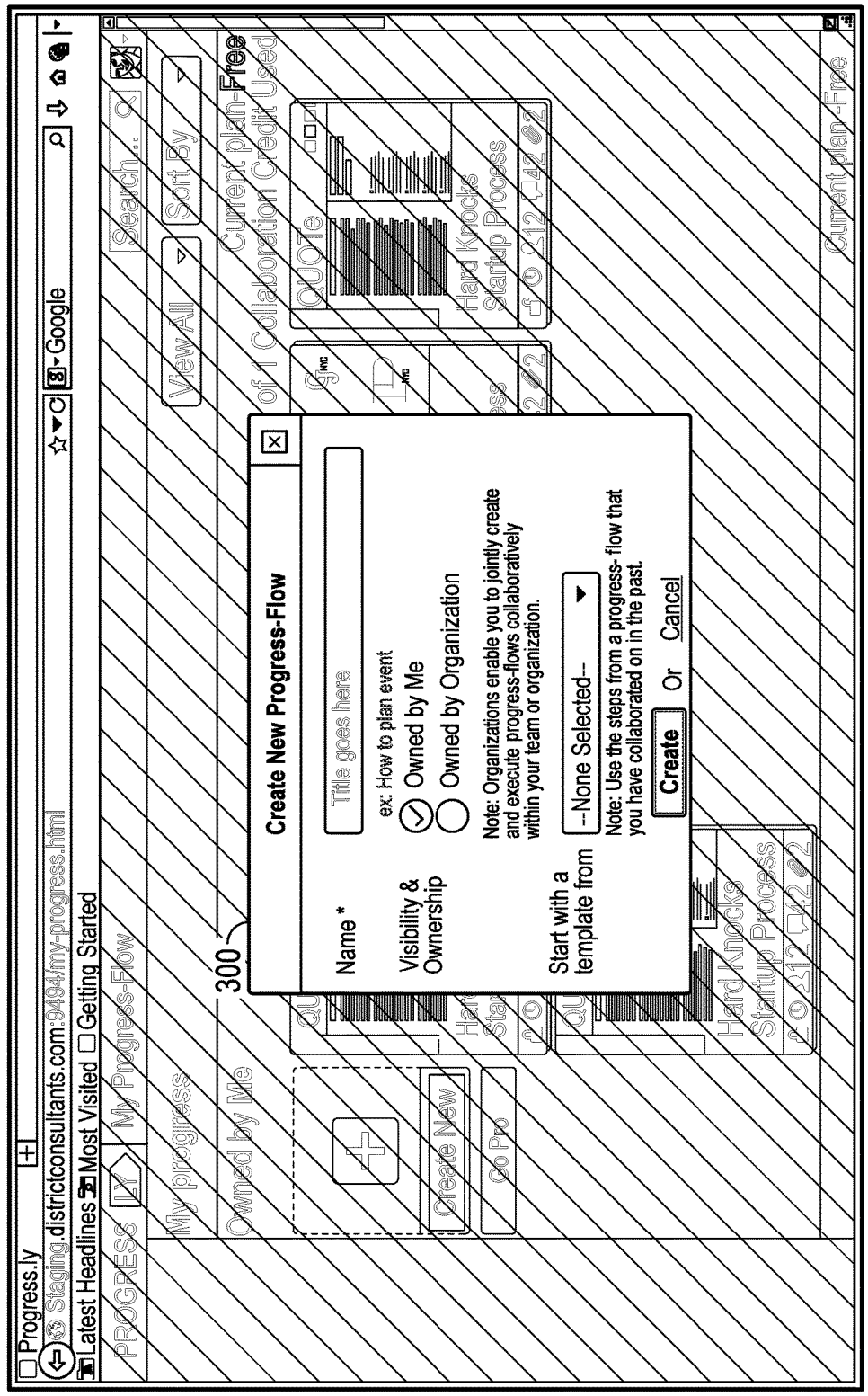
FIG. 3 shows an example of the Create New Progress flow dialog box.

The Create New button 202 on the Progress Dashboard enables the user to create a new progress flow. FIG. 3 shows an example of the Create New Progress flow dialog box 300, which opens when the user clicks the Create New button 202 (FIG. 2). From this dialog box, a user can create a progress flow that is owned by the user or by an organization. When creating a new progress flow, the user can also select an existing progress flow to use as a template, so that the users does not have to re-create steps that have already been created.

Figure 4:
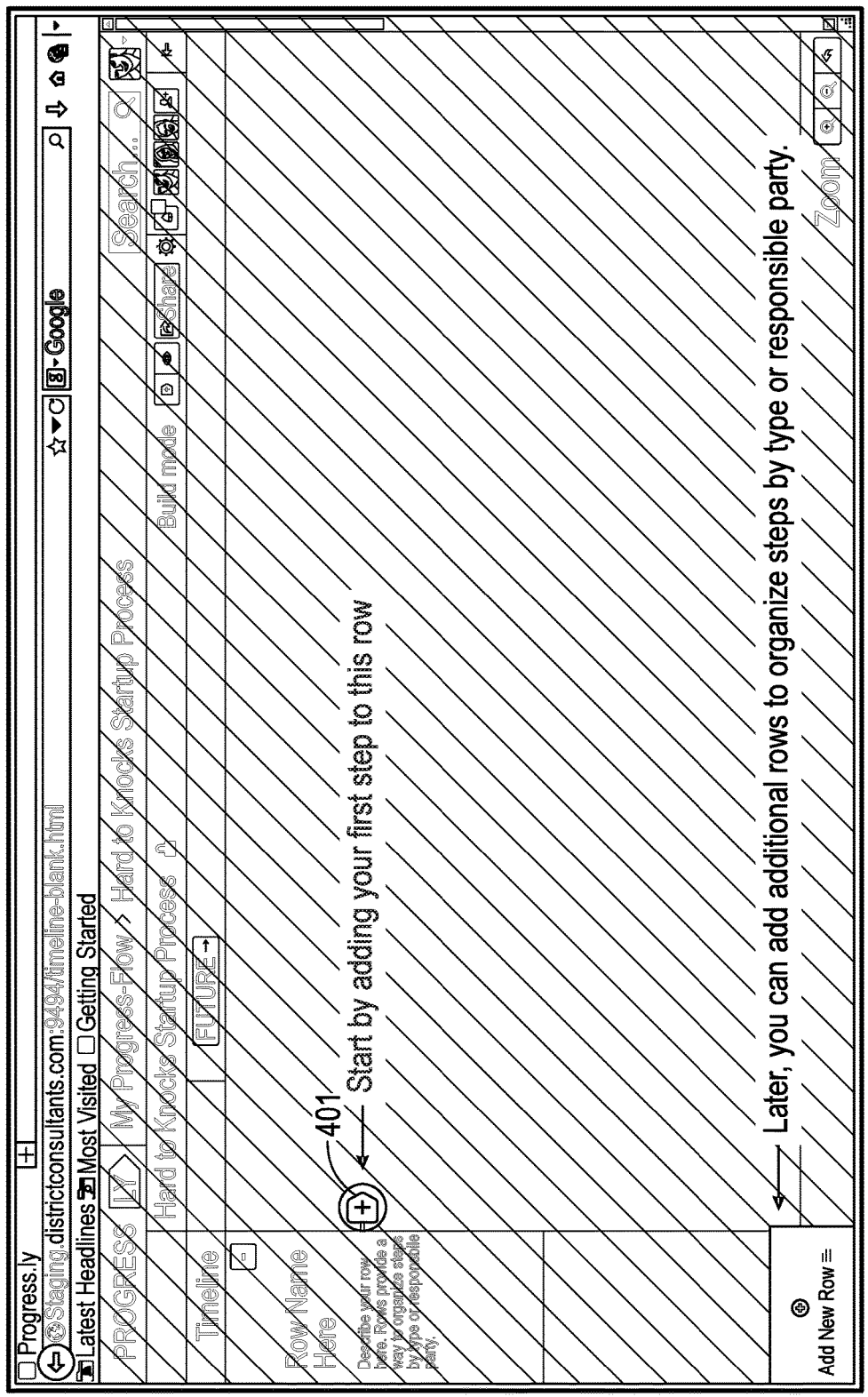
FIG. 4 shows an example of an Instructional Overlay display screen displayed when first creating a new progress flow.

FIG. 4 shows an example of an Instructional Overlay display screen that may be displayed when first creating a new progress flow. It guides the user in creating a step or creating a row. Creating a step starts the process of outlining a progress flow. A row is a way to organize steps by type or responsible party, or to indicate that multiple steps should happen in parallel.

Figure 5:
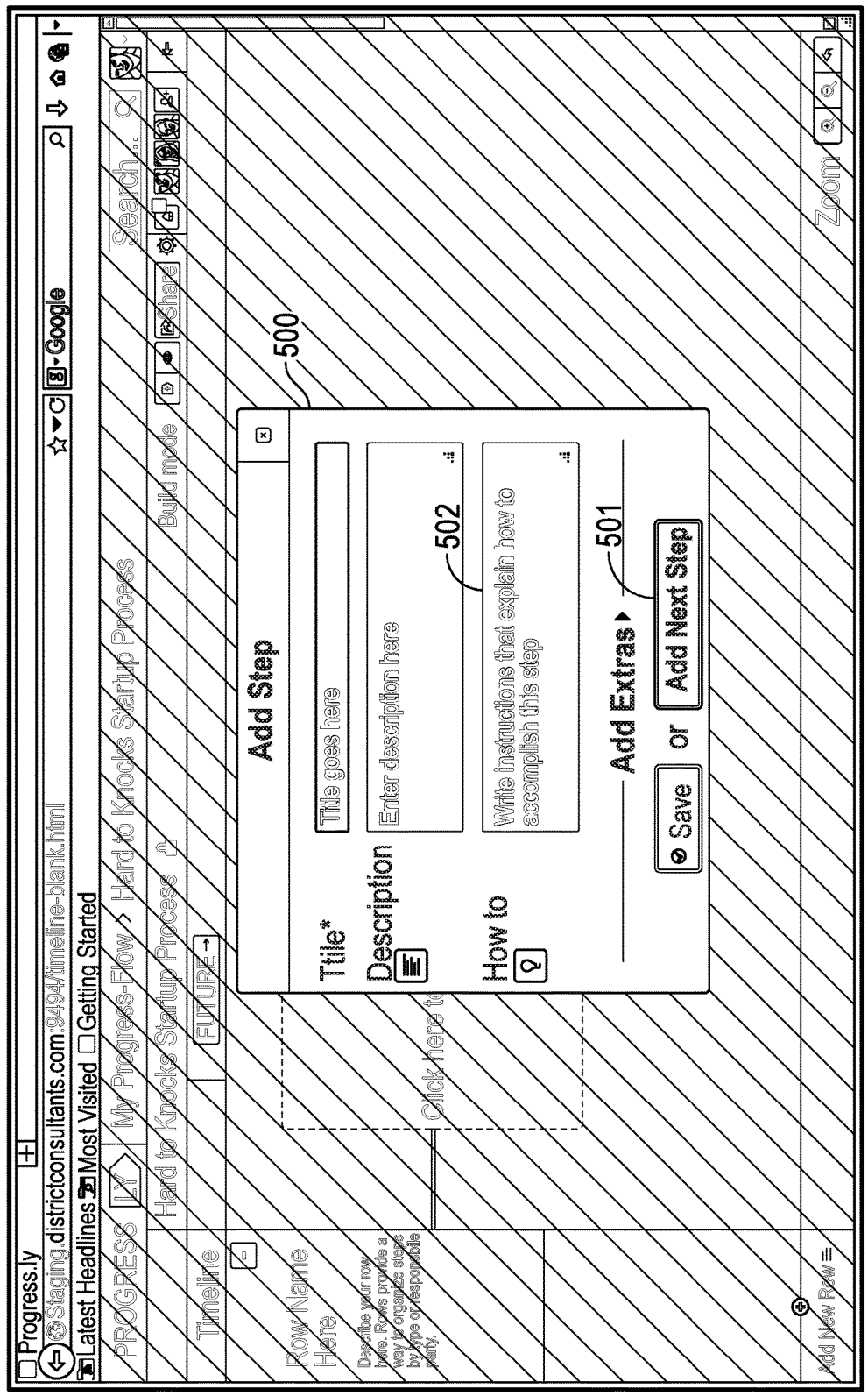
FIG. 5 shows an example of the Add Step dialog box associated with creating a new step.

FIG. 5 shows an example of the Add Step dialog box, which in one embodiment appears when the user clicks on the Add Step icon 401 (FIG. 4). The Add Step dialog box 500 enables the user to specify a title, description and how-to instructions for the step.

Figure 6:
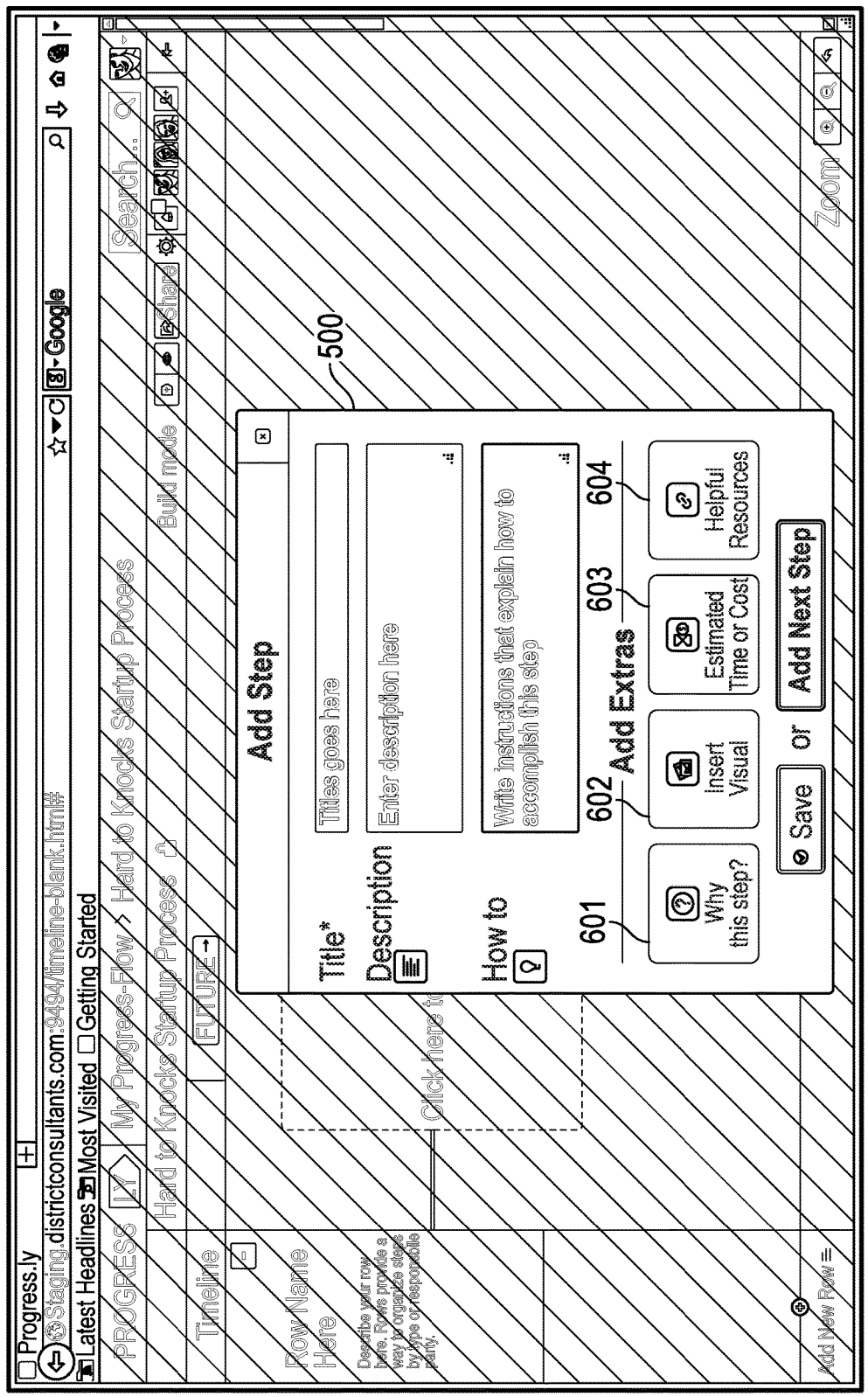
FIG. 6 shows an example of the Add Step dialog box with the Add Extras portion opened.

Additionally, the user can click on "Add Extras" 501 to associate other content with the step. For example, clicking on "Add Extras" 501 may cause the dialog box to be further opened as shown in FIG. 6. In that embodiment, the user can click on "Why this step?" 601 to input text to explain why the step is needed (which is helpful if others will be executing the step in the future). The user can also click "Insert Visual" 602 to add visual elements to help explain the step (i.e., images, documents, videos, or reference another progress flow for more detailed instruction/substeps). The user can also click "Estimated Time or Cost" 630 to input how much should be spent completing the step and how long the step should take to complete. The data can be used to produce a projected budget and a projected timeline. Additionally, the user can click "Helpful resources" 604 to attach hyperlinks to consultants or other resources around the web that could be of use when executing the step.

To indicate progress on a step, a user can drag and drop an object representing the user's progress into the step box that represents the step. For example, a user might drag and drop an icon or a hyperlink representing a document or other object into a step box. In response to this action, the first time this is done for a step, the step box changes its appearance in the progress flow (see, e.g., FIG. 1) from that of a future step (e.g., with a dashed outline and blank interior) to that of an in-progress or completed step (e.g., with solid outline and filled interior). Additionally, the step's step box automatically moves from the right of the current date to the left of the current date in the progress flow timeline.

Figure 7:
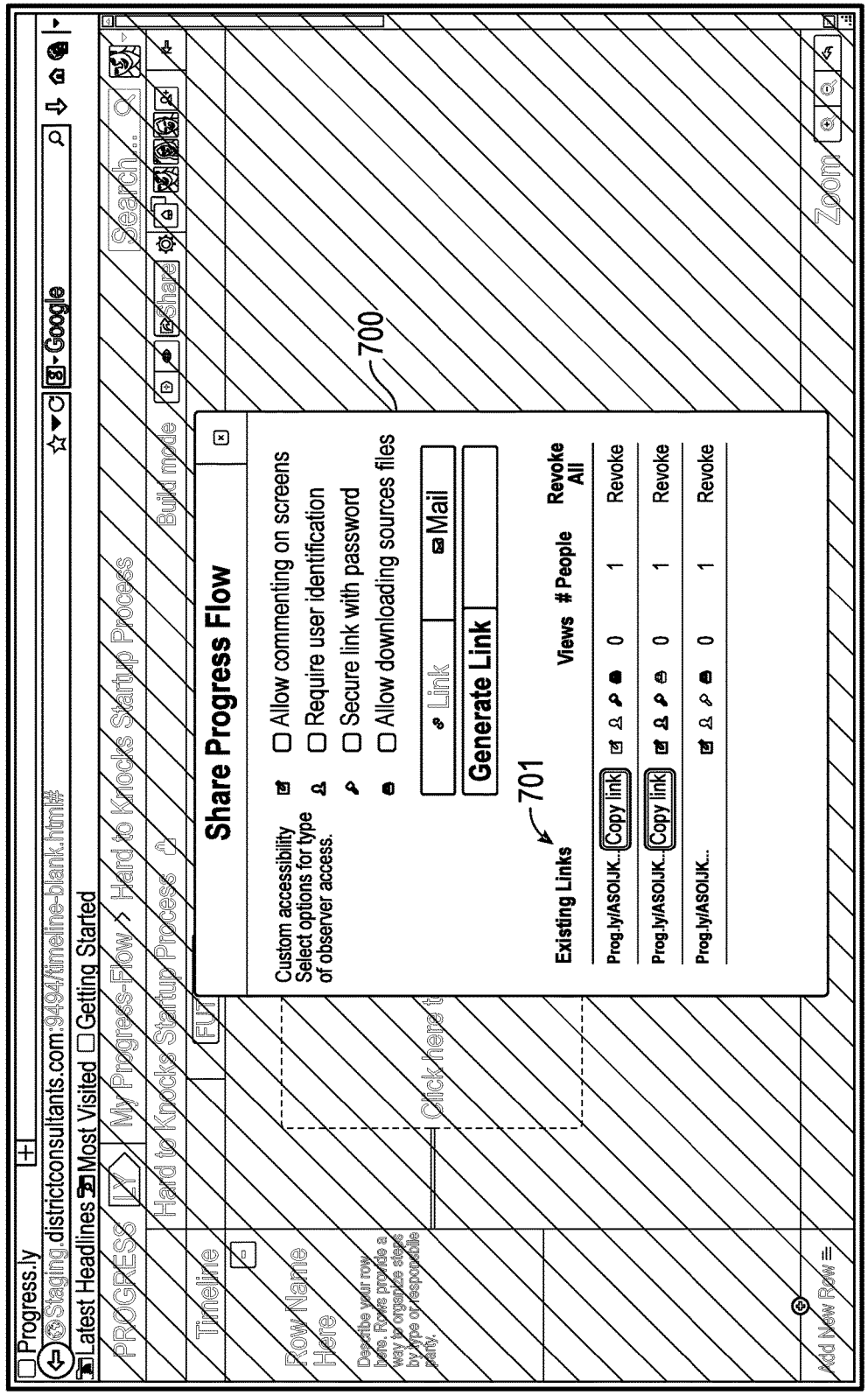
FIG. 7 shows an example of a Share Progress Flow dialog box.

FIG. 7 shows an example of a Share Progress Flow dialog box 700, which may be displayed when the user clicks on the Share button 104 (FIG. 1) to allow the user to invite Observer(s). The result of this dialog interaction is a hyperlink that can be sent via email to one or more observers. Each link has associated permissions with it that determine what an Observer can do. Collaborators with administrative privileges are able to create links or embed code to invite or share their progress flow with Observers. Existing links and their associated permissions are displayed and can be revoked at any time. Observers can input comments on each step in that step's dialog box.

Figure 8:
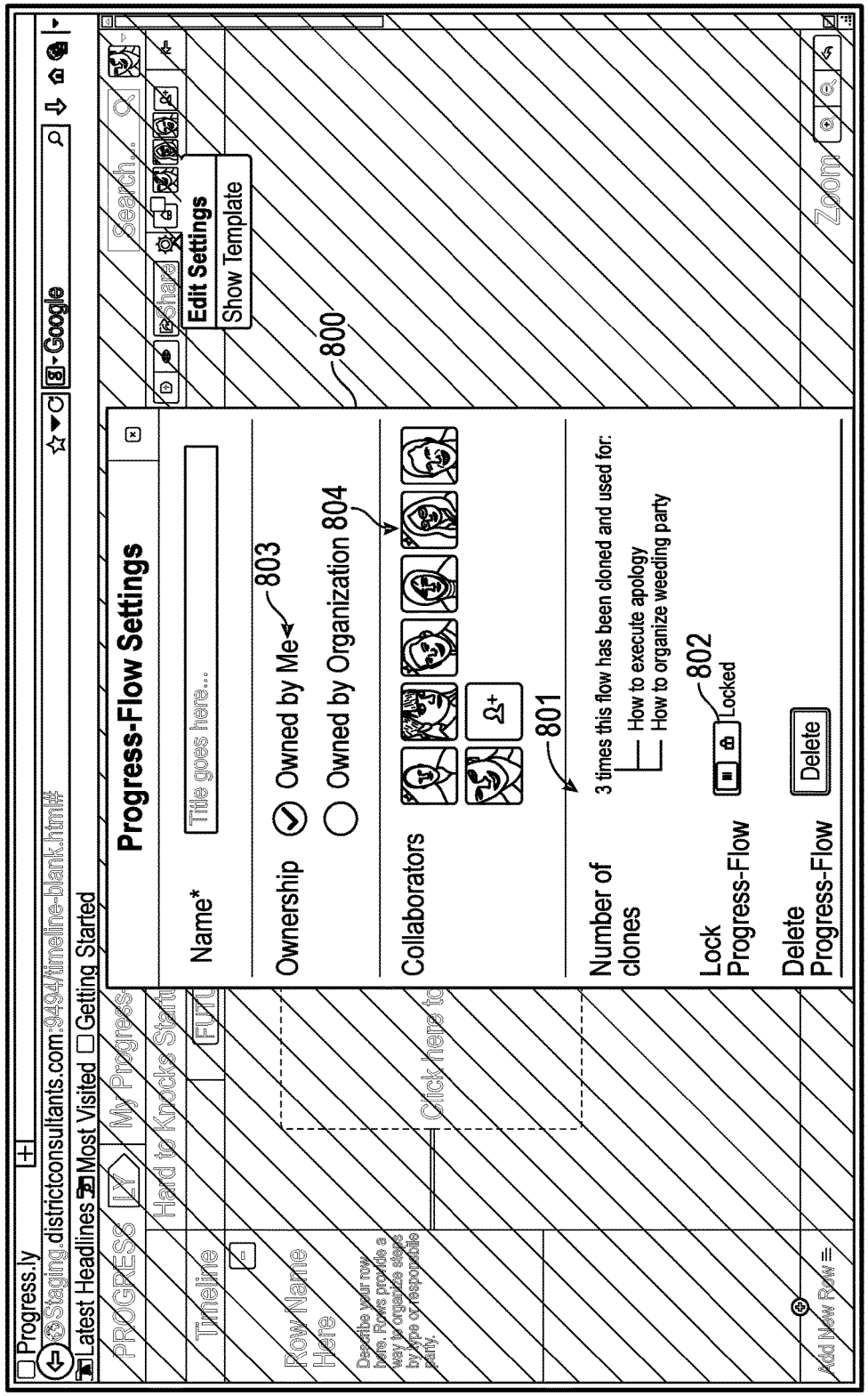
FIG. 8 shows an example of the Progress flow Settings dialog box.

FIG. 8 shows an example of the Progress flow Settings dialog box 800, which can be displayed when the user clicks an Edit Settings icon (not shown). In one embodiment, the Edit Settings icon appears on the Progress Dashboard display (FIG. 2) when the user hovers the mouse pointer over the icon 201 of any progress flow; it also may be displayed on the progress flow page (FIG. 1), e.g., in the form of a gear icon 105 in the top menu bar.

The Progress Flow Settings dialog box shows the number 801 of "clones" there are of the current progress flow. Because progress flows represent processes that are often used multiple times as templates, the lineage of the progress flow is displayed.

The Lock Progress Flow icon 802 enables locking a progress flow, which immediately makes the progress flow inaccessible to Observers and prevents it from being shared.

A progress flow can be "owned" by a user (e.g., the holder of the account being used to create or edit the progress flow) personally or by an organization with which the user is associated. The Ownership field 803 indicates which of these alternatives is the case.

The Progress flow Settings dialog box also shows Collaborators 804 associated with the progress flow. A Collaborator can be either an Admin Collaborator or a Row Collaborator (note: ownership and lock settings are only visible to those with the owner role).

Figure 9:
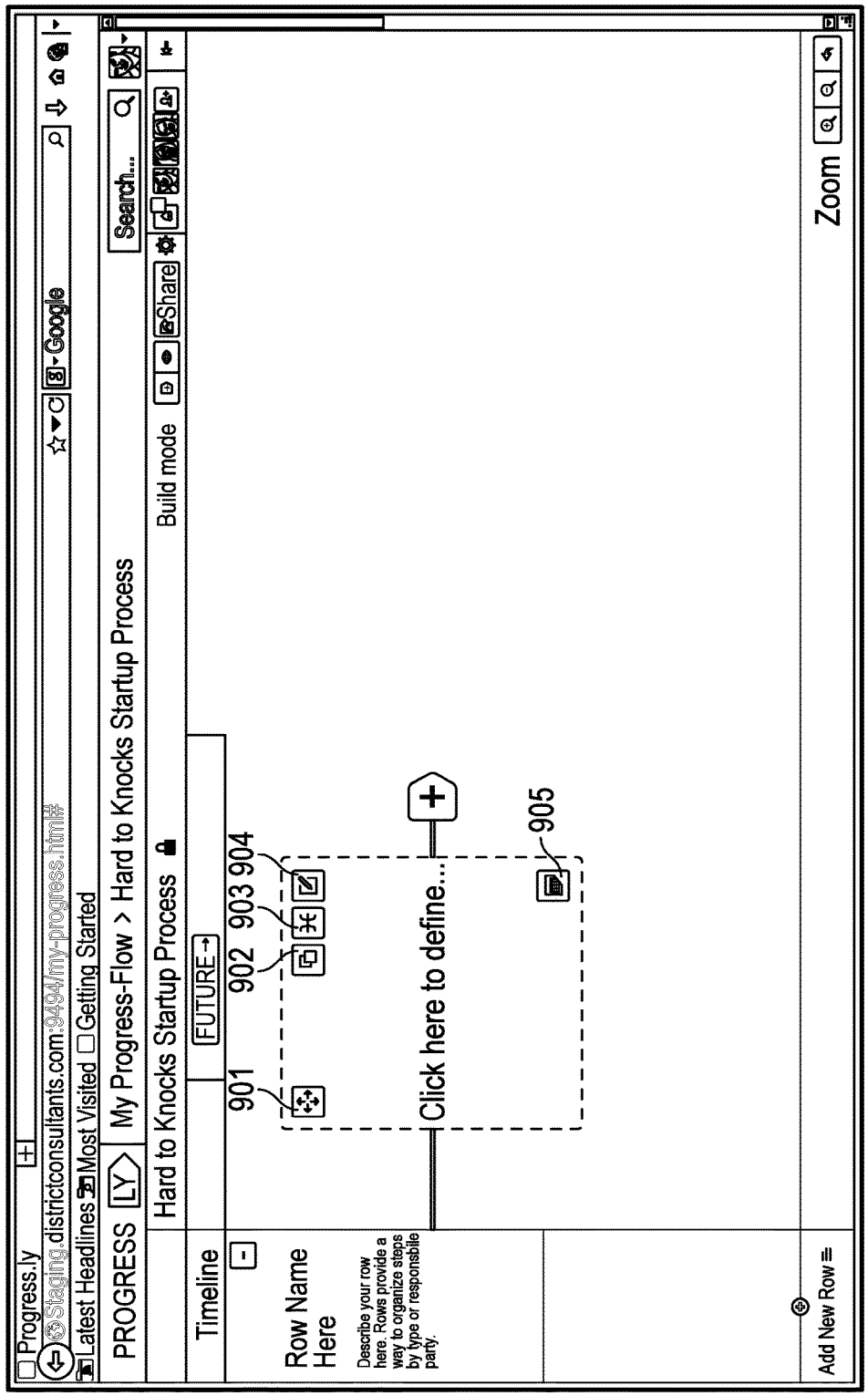
FIG. 9 shows a step box with various associated controls displayed.
Figure 10:
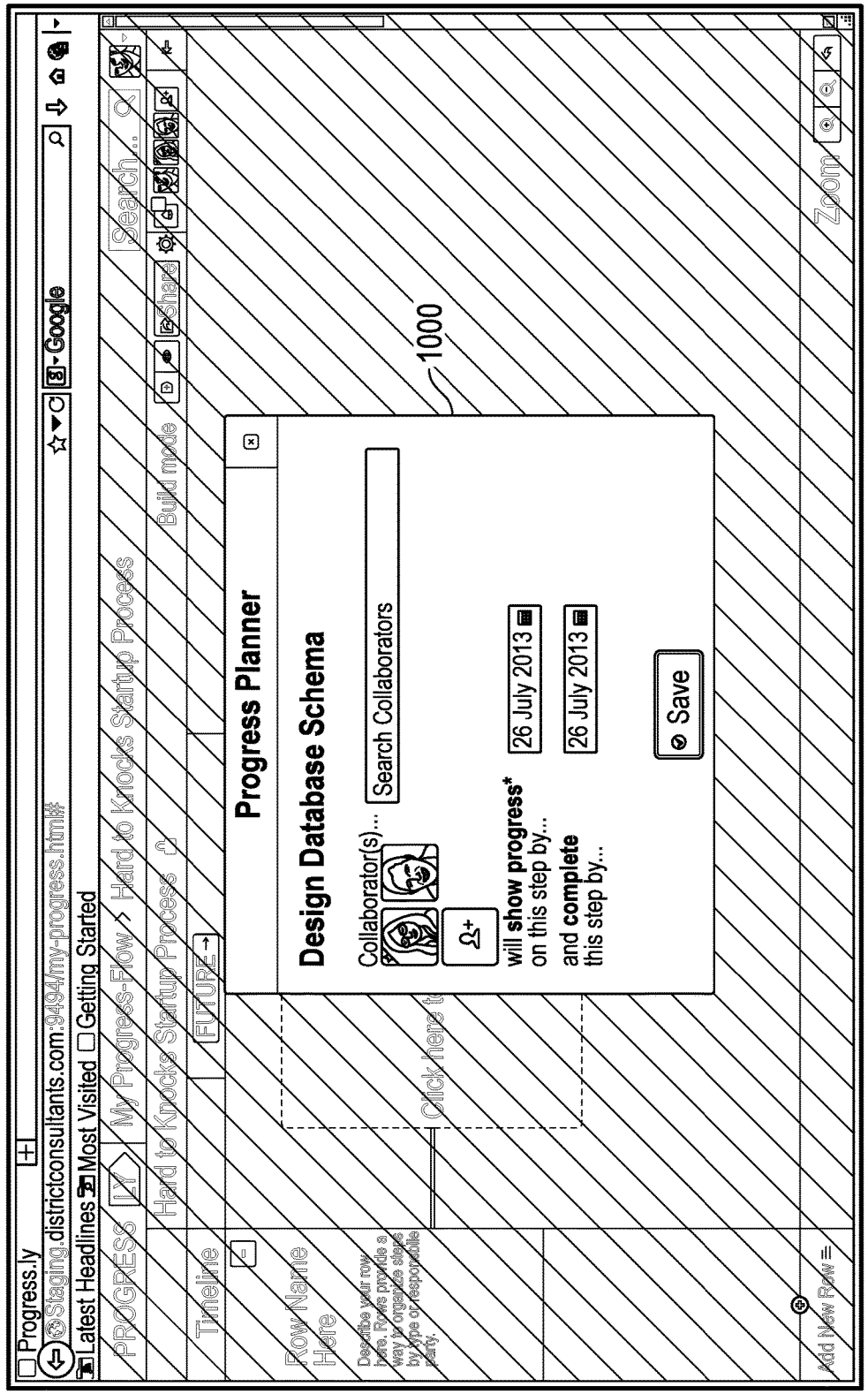
FIG. 10 shows an example of the Progress Planner dialog box.
Figure 11:
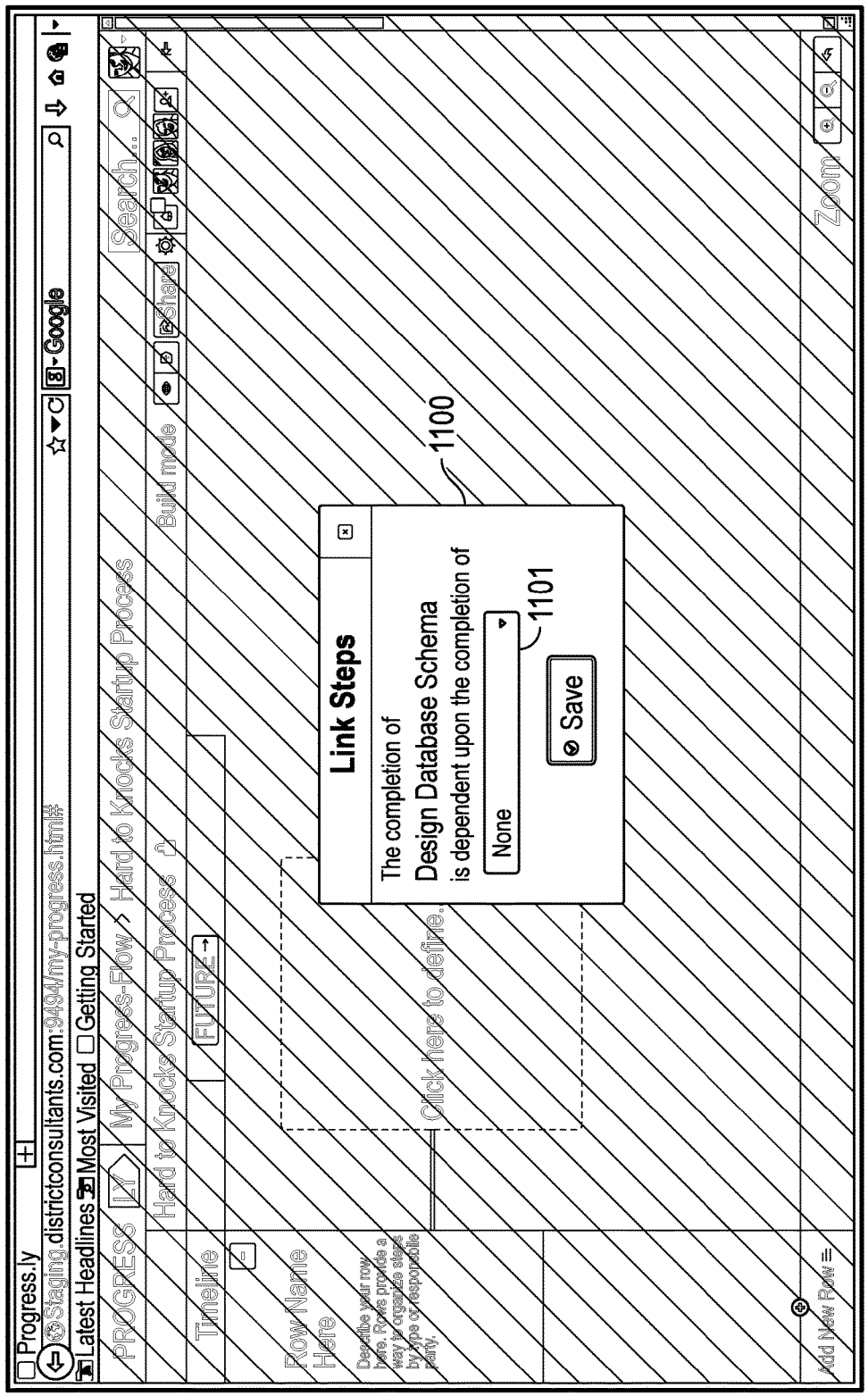
FIG. 11 shows an example of the Link Step Dialog box.

In one embodiment, when the user "hovers" the mouse pointer over the box representing a step, additional controls appear, as shown in the example of FIG. 9. In the embodiment of FIG. 9, these controls include a Move Step icon 901 (which can be used to move the step within the progress flow), a Copy Step icon 902 (which can be used to copy the step), a Link Step icon 903 (which can be used to specify a dependency of the step upon another step), and Progress Planner icon 904 (which used to assign the step to a collaborator and assign the date by which progress needs to be shown), and a date icon 905 (which can be used to specify or display by which the step needs to be completed). FIG. 10 shows an example of the Progress Planner dialog box 1000 that may be displayed when the user clicks on the Progress Planner icon 904. FIG. 11 shows an example of the Link Step Dialog box 1100 that may be displayed when the user clicks on the Link Step icon 903, to allow the user to set up a dependency between steps. The user inputs in field 1101 the step name of the step whose completion the current step depends on.

Figure 12:
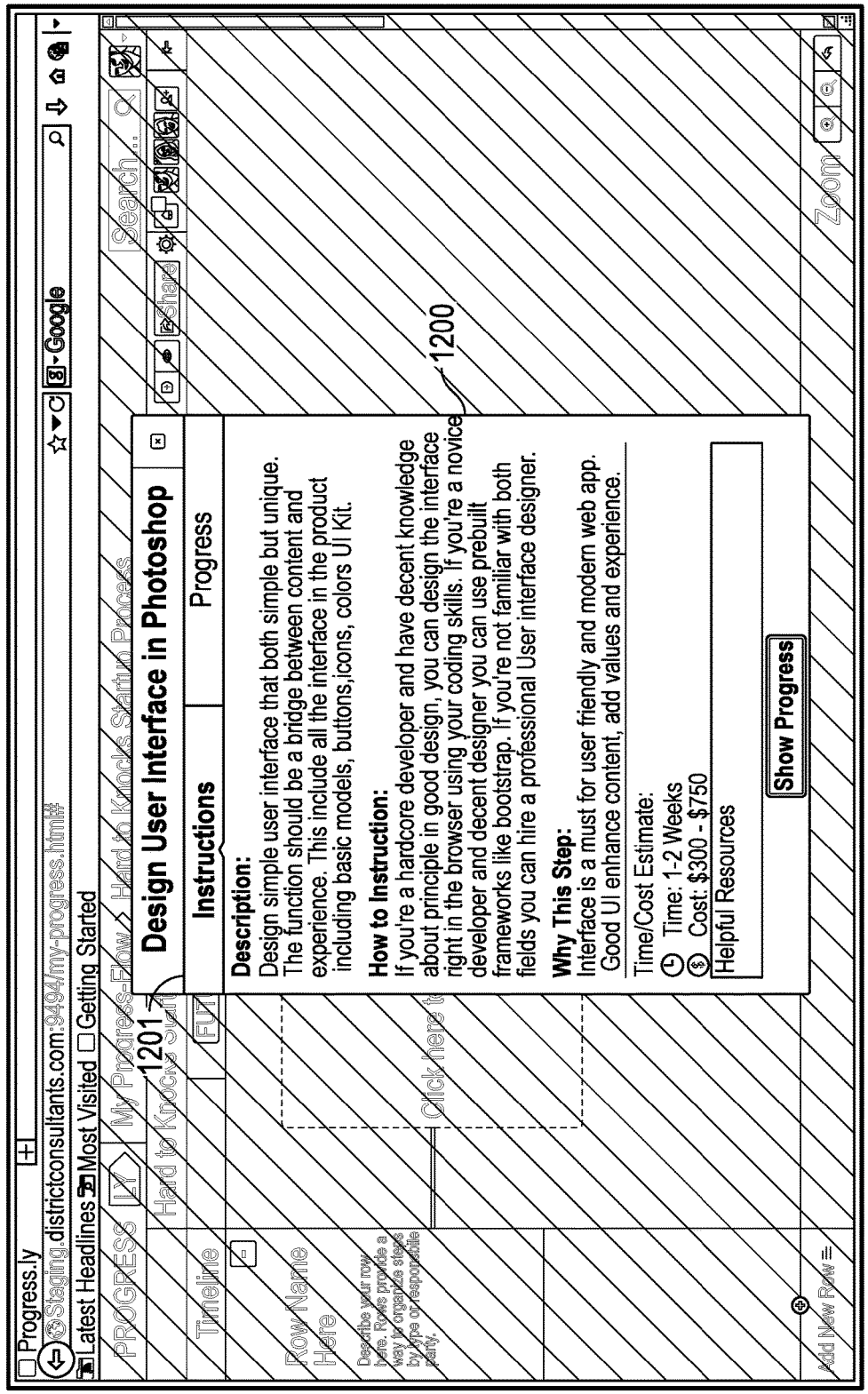
FIG. 12 shows an example of an Instructions tab in the Instructions/Progress dialog box.
Figure 13:
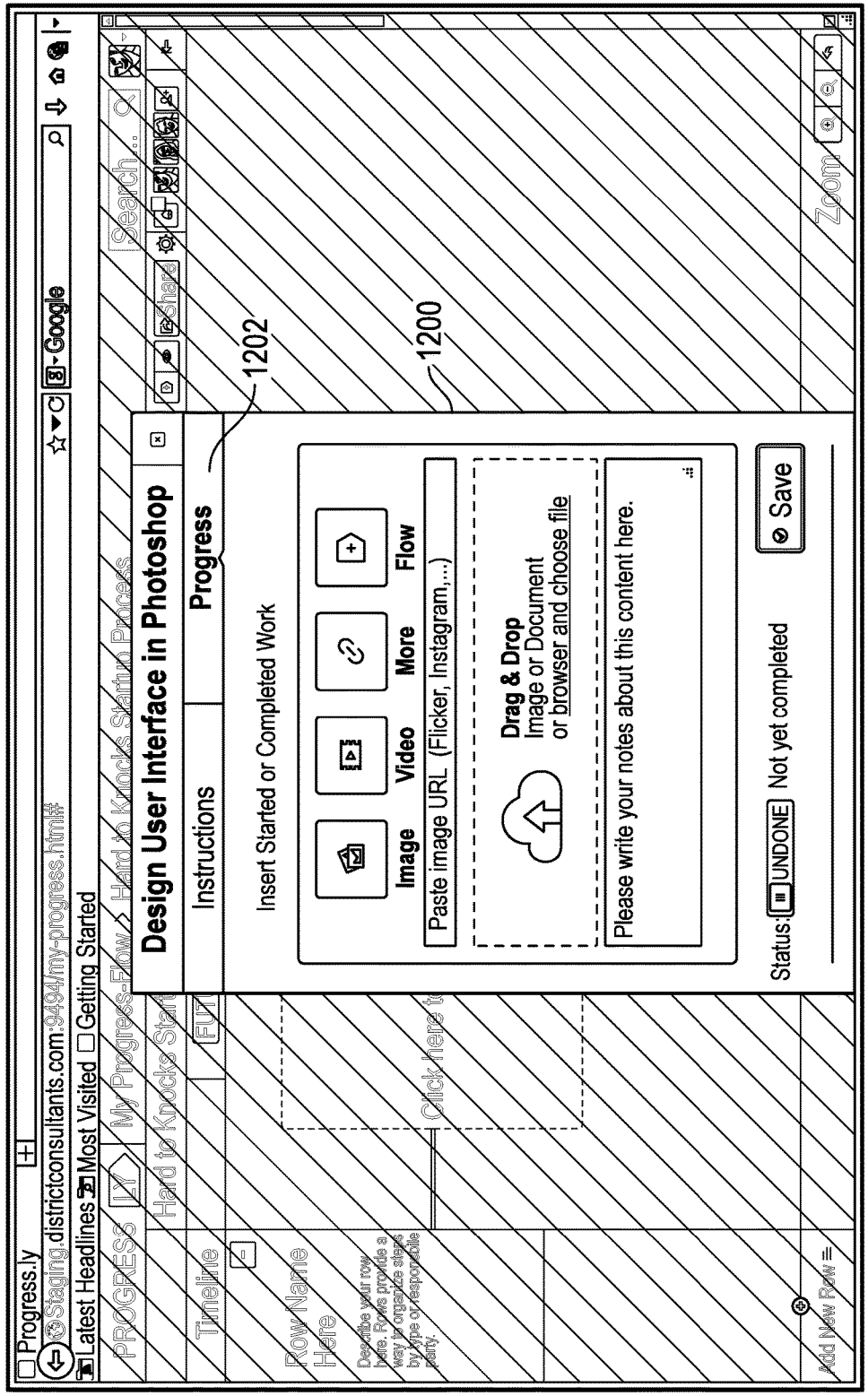
FIG. 13 shows an example of an Progress tab in the Instructions/Progress dialog box.

When a collaborator selects a step, for example by clicking the area within the box that represents the step in the displayed progress flow (e.g., FIG. 1), the Instructions/Progress dialog box appears, an example of which is shown in FIG. 12. The Instructions tab 1201 within the Instructions/Progress dialog box 1200 is the default tab and shows the instructions and extra elements (if any) that communicate information about the step, such as estimated time and cost, helpful resources (links), etc. The Progress tab 1202, shown in FIG. 13, enables the collaborator to insert content that shows that the step has been completed or that progress has been made on the step. Progress can be shown by uploading assets including: images, documents or referencing videos, web page links, or external progress flows, which are accomplished by clicking on the appropriate icons. The collaborator can also add comments explaining each asset that has been uploaded or referenced.

Figure 14:
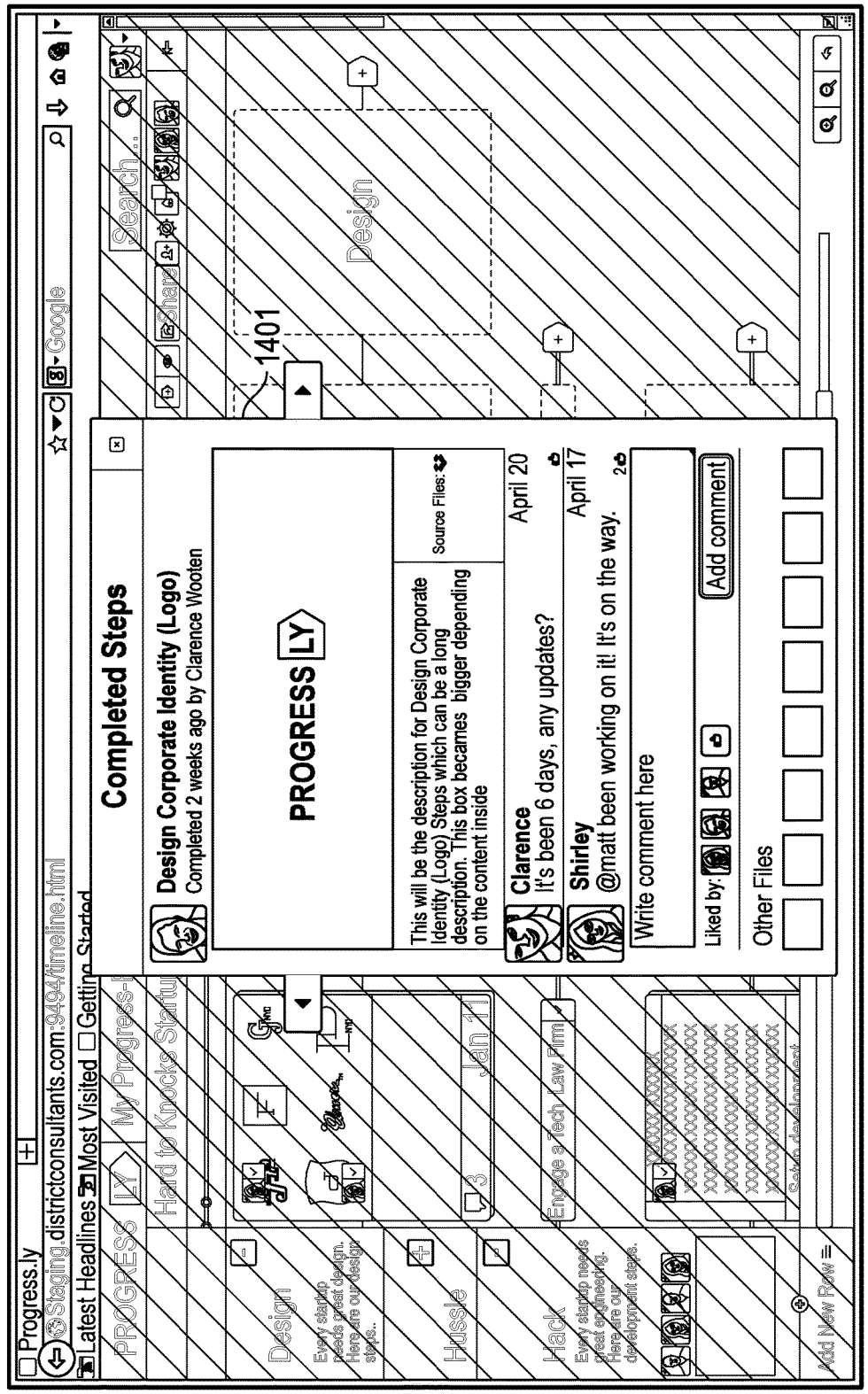
FIG. 14 shows an example of a step box dialog box.

When progress has been input for a step (e.g., by a user dragging and dropping content into its step box), its step box moves to the past (left) side of the timeline and takes on a solid outline, and is displayed to include some representative visual content (e.g., an image, portion of a text document, MIME type, etc., that has been associated with the step), such as image 106 in step box 107 in FIG. 1. Any convenient method can be used to select the representative visual content for a step box. When selected, the step box produces a dialog box, an example 1401 of which is shown in FIG. 14, which allows Collaborators and Observers (assuming they have been granted permission to do so) to view, comment on, "like," or download any asset associated with progress made for that step.

In certain embodiments, whenever a step is assigned to a person (as a to-do), the tool will automatically send a notification of that fact to that person. Also in certain embodiments, at some specified amount of time before the due date of any uncompleted step, the tool will automatically send a reminder notification to the person to whom the step has been assigned. These notifications can be sent using any known or convenient formats, protocols and media, such as email, instant message, short message service (SMS) message, automated prerecorded telephone call, etc. A given notification also may be sent concurrently using two or more different formats/protocols/media.

Figure 15:
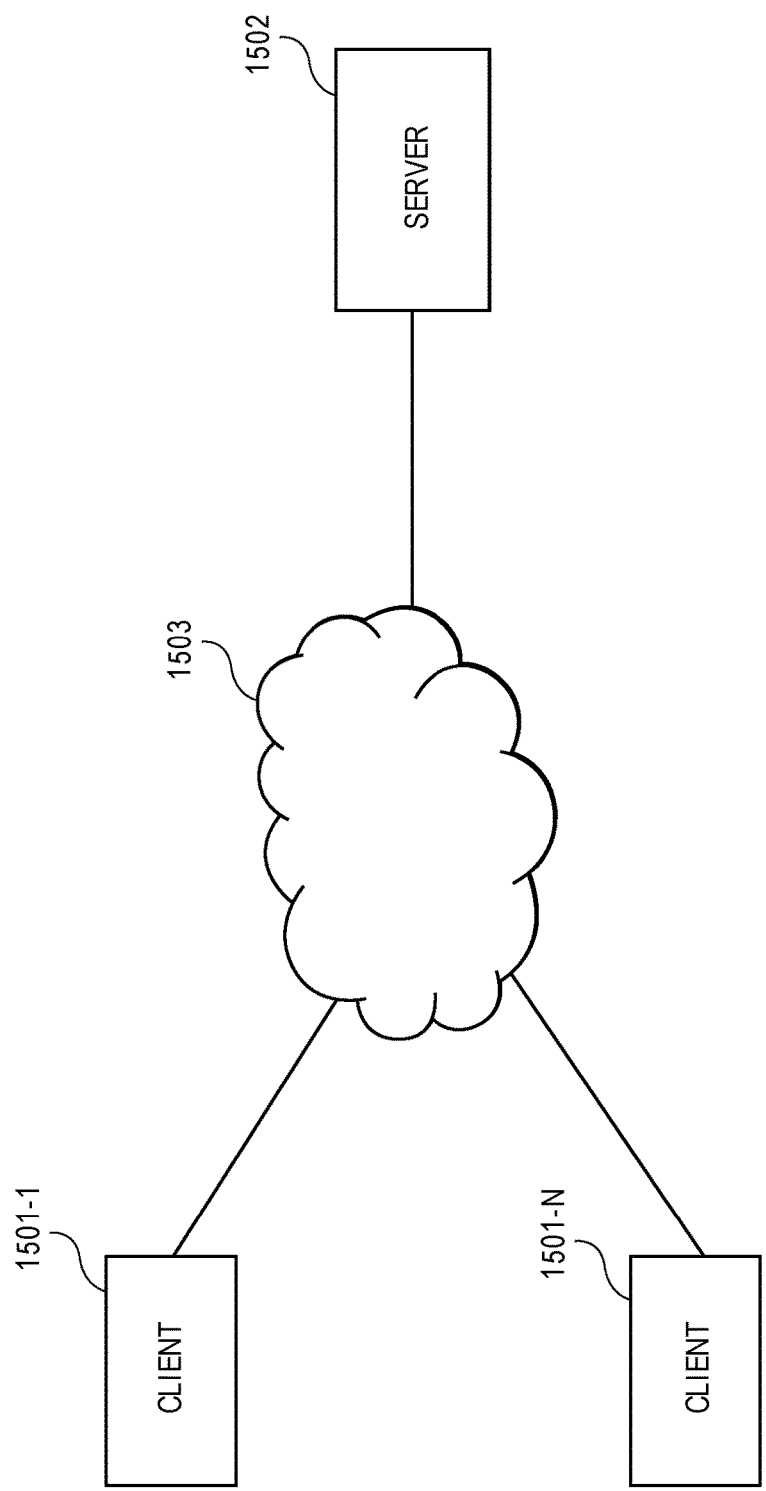
FIG. 15 illustrates a network environment in which the tool can be implemented.

As noted above, the tool described above can be implemented in a client-server environment, as shown in FIG. 15. In one embodiment, a number (N) of client devices 1501-1 through 1501-N access a server system 1502 via an interconnect 1503. Users of the tool use client devices 1501. The server system 1502 may be implemented as, for example, one or more server-class computers and data storage devices. A client device 1501 may be, for example, a desktop computer, laptop or notebook computer, tablet device, smartphone, or other types of processing device. The functionality of the tool can be implemented in the server system 1502, or in each client 1501, or it may be distributed between the server system 1502 and the client devices 1501. Within a given device (e.g., a client 1501 or server system 1502), the tool (or a portion thereof) can be implemented by one or more microprocessors executing computer program code stored in a memory and accessing data stored in a memory. The functionality of the server system 1502 or any client device 1501 can be physically implemented in a single physical enclosure or distributed among multiple physical enclosures, which may be connected via a network.

Network 1503 represents any one or more of various types of networks, which may be wired or wireless or a combination thereof. Network 1503 may include, for example, a personal area network (PAN), local area network (LAN), wide area network (WAN), metropolitan area networks (MAN), global internetwork such as the Internet, cellular telecommunications network, etc.

Figure 16:
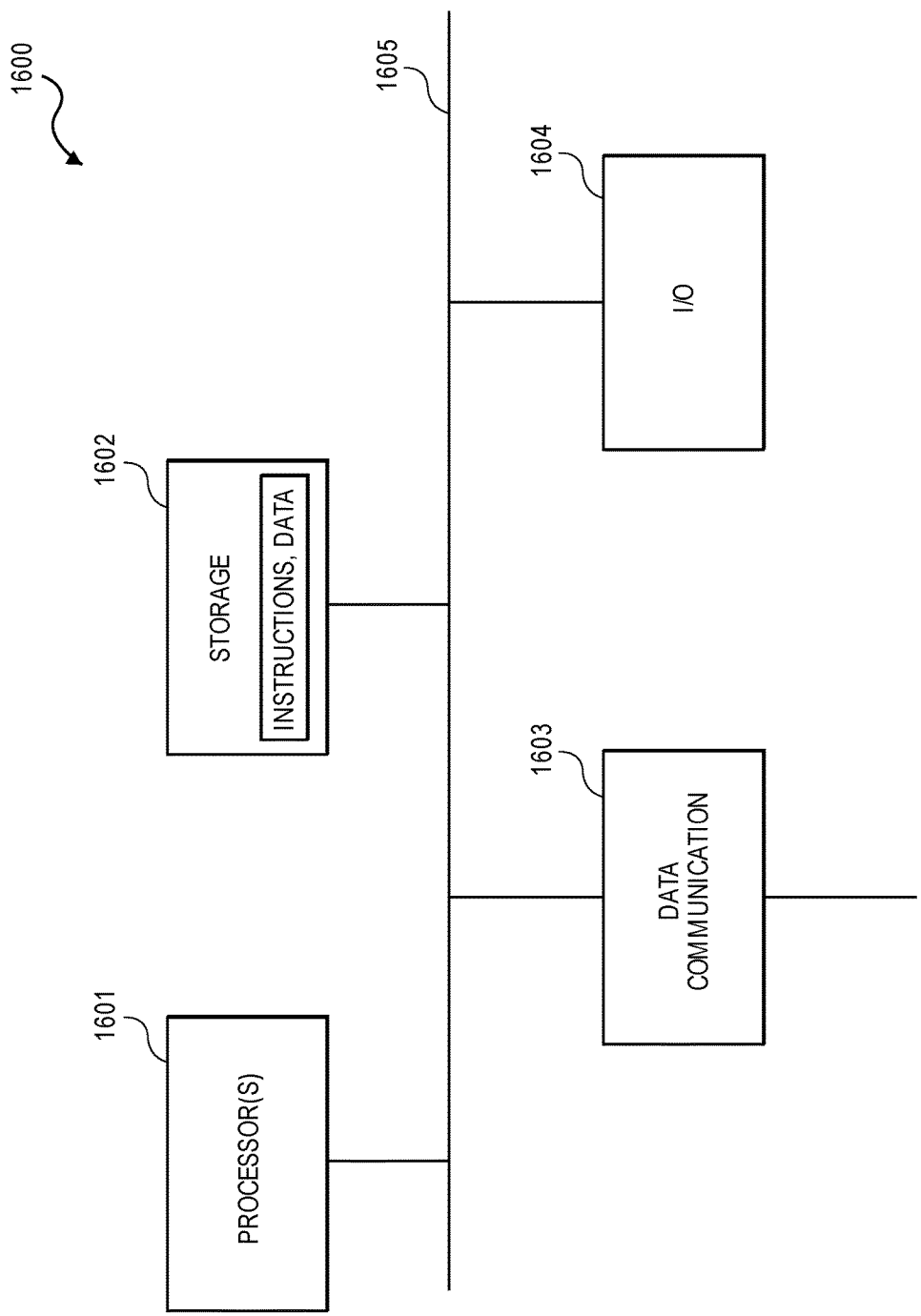
FIG. 16 is a high-level block diagram a processing system such as the server system or any of the client devices.

FIG. 16 shows an example, at a high level, of the internal architecture of a processing system 1600 representing any of the devices mentioned above, e.g., the server system 1502 or any of the client devices 1501. In the illustrated embodiment, the processing system 1600 includes one or more processors 1601, one or more data storage devices 1602, a data communication device 1603 and one or more input output (I/O) devices 1604. These components are connected to each other, either directly or indirectly, through an interconnect system 1605, which can include any one or more of various types of connections, including one or more point-to-point connections, buses, adapters, etc.

The processor(s) 1601 control the operation of the processing system 1600. Each processor 1601 can be or include a programmable microprocessor, microcontroller, application specific integrated circuit (ASIC), programmable logic device (PLD), or the like, or combination thereof. Each processor 1601 can execute instructions and/or operate upon data stored in storage device(s) 1602. Each storage device 1602 can include any of various forms of storage, including random access memory (RAM), read-only memory (ROM), flash memory, hard disk drive, digital versatile disk (DVD) drive, removable storage such as one or more USB drives, or the like, or combination thereof. Data communication device 1603 enables the processing system 1603 to communication with other processing systems over a network, such as interconnect 1503 in FIG. 15. Data communication device 1603 may be or include, for example, a convention cable modem, digital subscriber line (DSL) modem, Ethernet adapter, wireless transceiver, or the like.

In one embodiment, software for providing the client-side functionality can be coded in JavaScript. In such an embodiment, software for implementing the server-side functionality may be coded in, for example, Objective-C, Java, or a combination thereof.

The server system 1502 may include one or more databases to store data, such as user account data, data input by users (e.g., data defining progress flows, content associated with progress flows, settings, privileges), data defining the various user interface elements. Alternatively, at least some of that data can be stored, or at least cached, on one or more clients.

Figure 17:
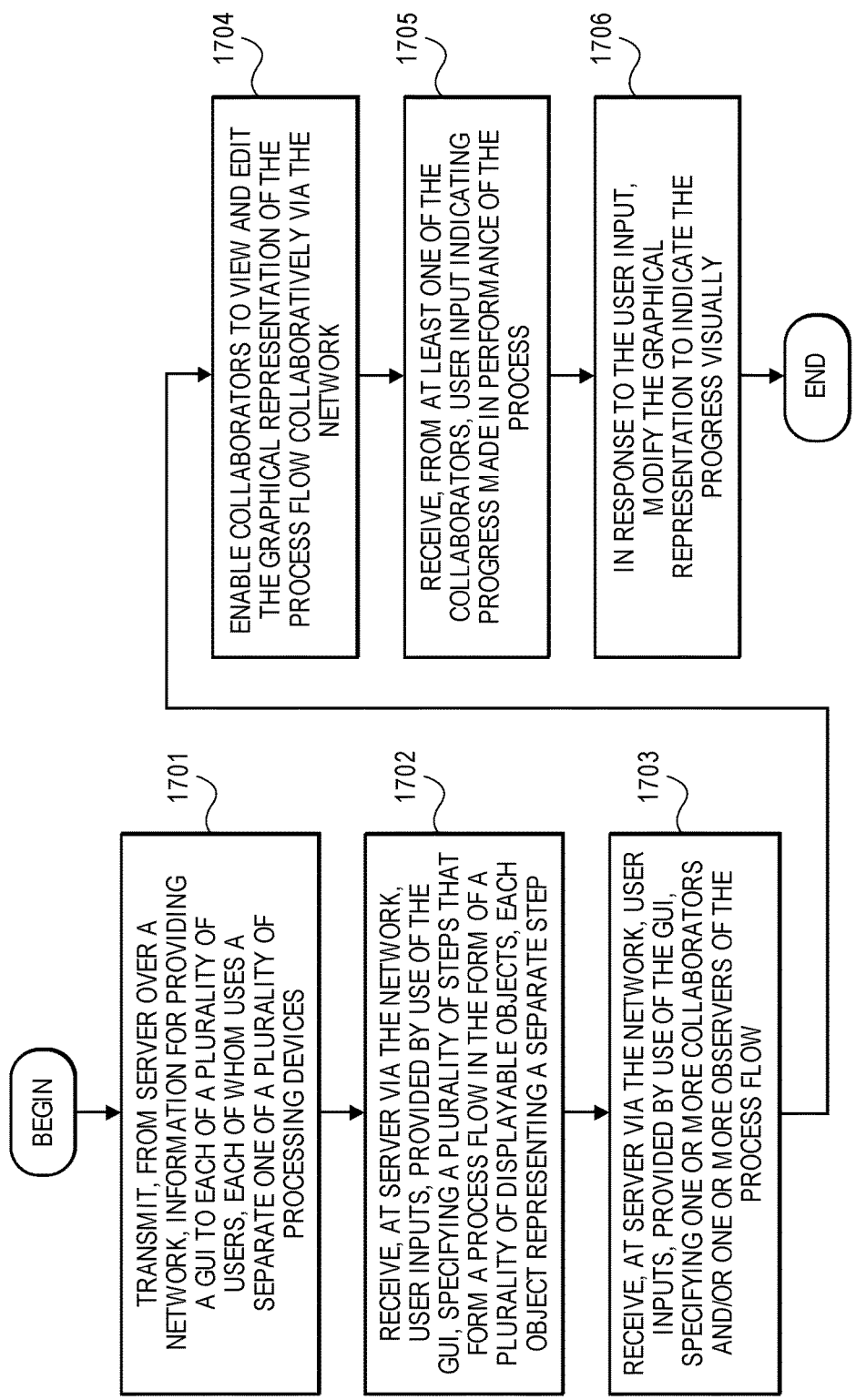
FIG. 17 is a flow diagram illustrating a basic example of the operation of the tool.

FIG. 17 shows a basic example of the operation of the tool, according to at least one embodiment. At operation 1701, the server system 1502 transmits information for providing a GUI to each of a plurality of users, each of whom uses a separate one of a plurality of client processing devices 1501. At operation 1702 the server system 1502 receives, via the network, user inputs, provided by use of the GUI, specifying a plurality of operations that form a process flow (also called a "progress flow" herein) in the form of a plurality of displayable objects (e.g., step boxes), each object representing a separate step. At operation 1703 the server system 1502 receives, via the network, user inputs, provided by use of the GUI, specifying one or more Collaborators and/or one or more Observers of the process flow. At operation 1704 the server system 1502, enables the Collaborators to view and edit the graphical representation of the process flow collaboratively via the network. At operation 1705 the server receives, from the client device 1501 of at least one of the Collaborators, user input indicating progress made in performance of the process. As mentioned above, this user input can be in the form of, for example, user input associating content with a step box, e.g., the dragging and dropping of an icon or hyperlink into a step box. At step 1706, in response to the user input, the server system 1502 modifies the graphical representation to indicate the progress visually, so that the Owner of the process flow as well as all Collaborators and Observers can see the indication of progress in the process flow displayed on their respective client devices 1501.

Note that many variations upon this process are possible. For example, at least some of the operations described above in reference to FIG. 17 can be performed on one or more of the client devices 1501 rather than on the server system 1502, as will be recognized by persons of ordinary skill in the art. Further, various operations can be added to or omitted from this process.

Figure 18:
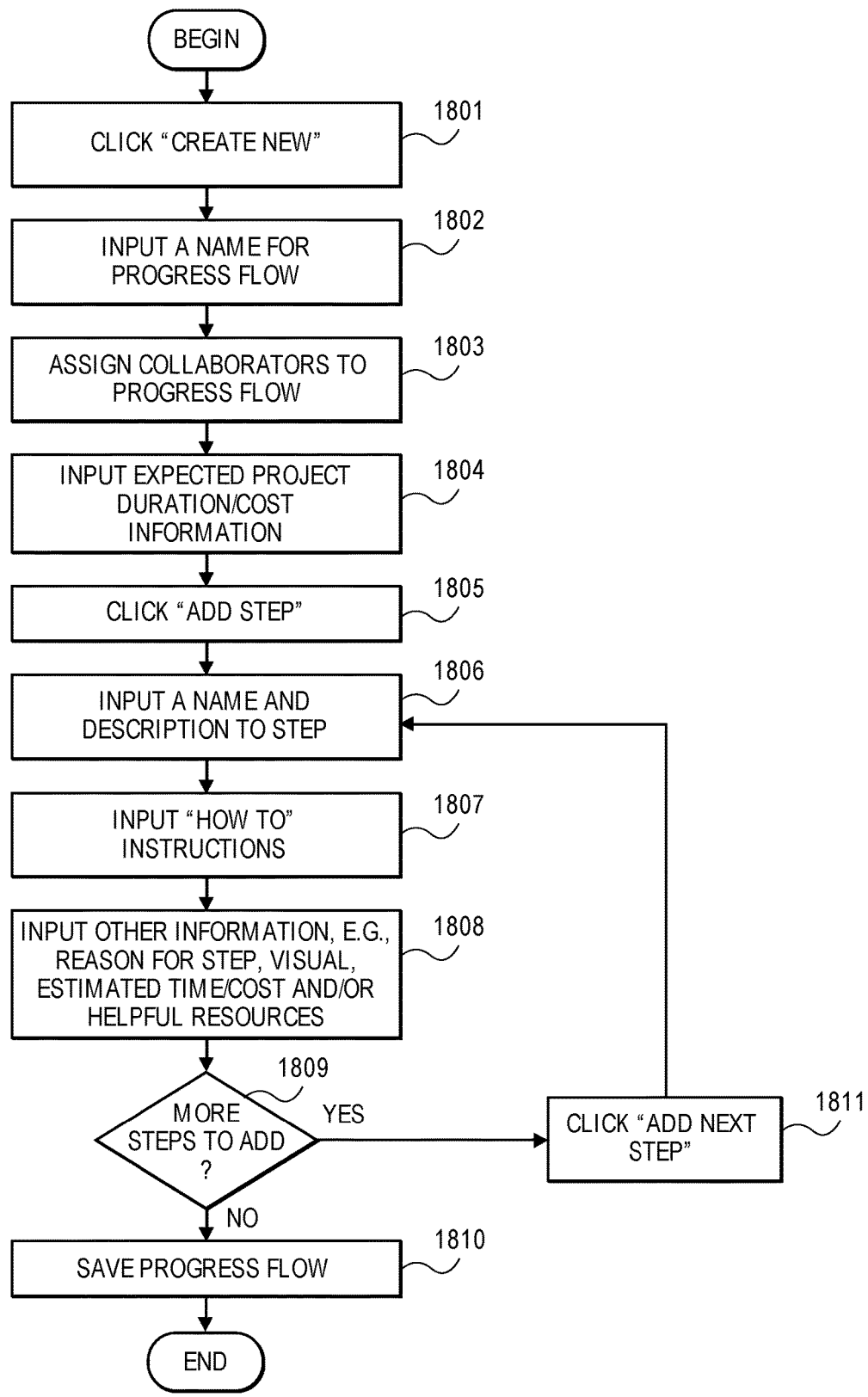
FIG. 18 is a flow diagram illustrating a simple example of how a user can use the tool.

FIG. 18 shows a simple example of how a user can use the tool. At operation 1801, to create a new progress flow the user clicks the "Create New" icon 202 on the GUI (FIG. 2). The term "click" as used herein means to select or activate a GUI control in any known or convenient manner, which can be, for example, by use of a mouse or other conventional pointing device, via keyboard, via speech recognition, etc. At operation 1802 the user inputs a name for the progress flow into a dialog box 300 representing the progress flow (FIG. 3). At operation 1803 the user can assign one or more Collaborators to the progress flow, by inputting their names or identifiers in the Progress flow Settings dialog box 800 (FIG. 8). At operation 1804 the user can input expected project duration/cost information for the progress flow. At operation 1805 the user clicks the "Add step" icon 401 (FIG. 4) to add a step to the progress flow. At operation 1806 the user inputs a name and a description for the step into appropriate input fields in the dialog box 500 that represents the step (FIG. 5). At operation 1807 the user can input "how to" instructions for the step (FIG. 5) by typing, copying or speaking text into the "How to" field 502. At operation 1808 the user can input other information for the step, e.g., reason for the step, a visual object, estimated time/cost and/or helpful resources, into the dialog box 500. Next, if there are more steps to add to the progress flow at step 1809, then the user clicks the Add Next Step button 501 at step 1811 to cause the process to loop back to operation 1806, where the tool adds a new step after the last step, and a new step dialog box 500 is displayed to the user to specify details of the new step. If there are no more steps to add, then at operation 1810 the user clicks a Save icon to save the progress flow.

Note that many variations upon this process are possible. For example, at least some of the operations described above in reference to FIG. 18 can be performed on one or more of the client devices 1501 rather than on the server system 1502, as will be recognized by persons of ordinary skill in the art. Further, various operations can be added to or omitted from this process.

Data Dictionary

The following describes the various data entities that are used in one embodiment of the tool.

1. prog_template

This is a standard table with the base fields every table should have.
Fields:

| Name | Type | Description | Comments |
|---|---|---|---|
| id | INT(11) | PK | |
| parameters | LONGTEXT | optional JSON configuration object | nullable |
| created | TIMESTAMP | the object's created date | |
| updated | TIMESTAMP | the object's date last modified | |
| created_by | INT(11) | FK to prog_user table | |
| updated_by | INT(11) | FK to prog_user table | |
| active | TINYINT(1) | BOOLEAN, is active? | |
| status | INT(11) | FK to status table | |

2. prog_users

This is a generic users table.
Fields:

| Name | Type | Description | Comments |
|---|---|---|---|
| id | INT(11) | | |
| name | TEXT | | |
| username | TEXT | | |
| email | TEXT | | |
| password | TEXT | | |
| type | TEXT | | |
| block | TINY INT(1) | BOOLEAN | |
| send_email | TINY INT(1) | BOOLEAN | |
| register_date | DATETIME | | |
| last_visit_date | DATETIME | | |
| active | TINYINT(1) | BOOLEAN | |
| parameters | LONGTEXT | optional JSON configuration object | nullable |
| created | TIMESTAMP | | |
| updated | TIMESTAMP | | |
| status | INT(11) | | |
| created_by | INT(11) | FK to prog_user | |

3. prog_organizations prog_organization defines a company of organization that many collaborators belong to.
Fields:

| Name | Type | Description | Comments |
|---|---|---|---|
| id | INT(11) | PK | |
| name | TEXT | | |
| description | LONGTEXT | | nullable |
| size | TEXT | | nullable |
| industry | TEXT | | nullable |
| parameters | LONGTEXT | optional JSON configuration object | nullable |
| created | TIMESTAMP | the object's created date | |
| updated | TIMESTAMP | the object's date last modified | |
| created_by | INT(11) | FK to prog_user's | |
| updated_by | INT(11) | FK to prog_user table | |
| active | TINYINT(1) | BOOLEAN, is active? | |
| status | INT(11) | FK to status table | |

4. prog_addresses

This is represents a user or company address.
Fields:

| Name | Type | Description | Comments |
|---|---|---|---|
| id | INT(11) | PK | |
| user_id | INT(11) | FK to prog_user table | nullable |
| organization_id | INT(11) | FK to prog_organization table | nullable |
| type | TEXT | | |
| address_1 | TEXT | | nullable |
| address_2 | TEXT | | nullable |
| address_3 | TEXT | | nullable |
| city | TEXT | | nullable |
| state | TEXT | | nullable |
| zip | TEXT | | nullable |
| phone | TEXT | | nullable |
| country | TEXT | | nullable |
| description | LONGTEXT | | nullable |
| name | TEXT | | nullable |
| parameters | LONGTEXT | optional JSON configuration object | nullable |
| created | TIMESTAMP | the object's created date | |
| updated | TIMESTAMP | the object's date last modified | |
| created_by | INT(11) | FK to prog_user's | |
| updated_by | INT(11) | FK to prog_user table | |
| active | TINYINT(1) | BOOLEAN, is active? | |
| status | INT(11) | FK to status table | |

5. prog_flows prog_flow objects are at the top of the progress flow hierarchy. All configuration data related to the entire progress flow is contained within this table, along with the title, description, etc.
Fields:

| Name | Type | Description | Comments |
|---|---|---|---|
| id | INT(11) | PK | |
| name | TEXT | | |
| description | LONGTEXT | | nullable |
| title | TEXT | | nullable |
| instructions | LONGTEXT | | nullable |
| allow_comments | TINYINT(1) | BOOLEAN | |
| allow_collaboration | TINYINT(1) | BOOLEAN | |

| Name | Type | Description | Comments |
| --- | --- | --- | --- |
| parameters | LONGTEXT | optional JSON configuration object | nullable |
| created | TIMESTAMP | the object's created date | |
| updated | TIMESTAMP | the object's date last modified | |
| created_by | INT(11) | FK to prog_user's | |
| updated_by | INT(11) | FK to prog_user table | |
| active | TINYINT(1) | BOOLEAN, is active? | |
| status | INT(11) | FK to status table | |

6. prog_rows prog_row objects represent the progress flow's container for "steps". Each row corresponds with a particular activity, department, or subject matter within a progress flow. prog_row objects group prog_steps logically according to purpose or goal.
Fields:

| Name | Type | Description | Comments |
| --- | --- | --- | --- |
| id | INT(11) | PK | |
| flow_id | INT(11) | FK to prog_flow table | |
| name | TEXT | | |
| description | LONGTEXT | | nullable |
| title | TEXT | | nullable |
| instructions | LONGTEXT | | nullable |
| allow_comments | TINYINT(1) | BOOLEAN | |
| allow_collaboration | TINYINT(1) | BOOLEAN | |
| position | INT(11) | sets the position of the step relative to other steps in a flow's row | |
| parameters | LONGTEXT | optional JSON configuration object | nullable |
| created | TIMESTAMP | the object's created date | |
| updated | TIMESTAMP | the object's date last modified | |
| created_by | INT(11) | FK to prog_user's | |
| updated_by | INT(11) | FK to prog_user table | |
| active | TINYINT(1) | BOOLEAN, is active? | |
| status | INT(11) | FK to status table | |

7. prog_steps prog_step objects represent an individual "node" within a row around which content is created and collaborated on. Prog_steps represent the individual steps within a row that constitute a progress flow.
Fields:

| Name | Type | Description | Comments |
| --- | --- | --- | --- |
| id | INT(11) | PK | |
| flow_id | INT(11) | FK on prog_flow table | |
| row_id | INT(11) | FK to prog_row table | nullable |
| name | TEXT | | |
| description | LONGTEXT | | nullable |
| title | TEXT | | nullable |
| instructions | LONGTEXT | | nullable |
| estimated_time | FLOAT | | nullable |
| estimated_cost | FLOAT | | nullable |
| progress_by_date | DATETIME | | nullable |
| complete_by_date | DATETIME | | nullable |
| position | INT(11) | sets the position of the step relative to other steps in a flow's row | |
| allow_comments | TINYINT(1) | BOOLEAN | |
| allow_collaboration | TINYINT(1) | BOOLEAN | |
| parameters | LONGTEXT | optional JSON configuration object | nullable |
| created | TIMESTAMP | the object's created date | |
| updated | TIMESTAMP | the object's date last modified | |
| created_by | INT(11) | FK to prog_user's | |
| updated_by | INT(11) | FK to prog_user table | |
| active | TINYINT(1) | BOOLEAN, is active? | |
| status | INT(11) | FK to status table | |
| estimated_time_type | TEXT | | |
| estimated_cost_type | TEXT | | |
| explanation | LONGTEXT | | |

8. prog_contents prog_content objects represent all content that can be associated at the flow, row, step, comment, and notes level. Content will be of the types defined in the prog_content_type table. All content items have a JSON object defined allowing for flexible configurations of content items.
Fields:

| Name | Type | Description | Comments |
|---|---|---|---|
| id | INT(11) | PK | |
| type | INT(11) | FK to prog_content_type | |
| flow_id | INT(11) | FK on prog_flow | |
| parameters | LONGTEXT | stores a JSON object with data relevant to content object | nullable |
| content_binary | LONGBLOB | binary data | nullable |
| content_text | LONGTEXT | | nullable |
| created | TIMESTAMP | the object's created date | |
| updated | TIMESTAMP | the object's date last modified | |
| created_by | INT(11) | FK to prog_user's | |
| updated_by | INT(11) | FK to prog_user table | |
| active | TINYINT(1) | BOOLEAN, is active? | |
| status | INT(11) | FK to status table | |

9. prog_content_types prog_content_type table is simply a list of values for all of the types of content that can be supported in the system.

The likely values of this table are: Video, Image, Map, Profile Page, Tweet, Weblink, URL, Source Document.
Fields:

| Name | Type | Description | Comments |
|---|---|---|---|
| id | INT(11) | PK | |
| name | TEXT | | |
| description | LONGTEXT | | nullable |
| created | TIMESTAMP | the object's created date | |
| updated | TIMESTAMP | the object's date last modified | |
| created_by | INT(11) | FK to prog_user's | |
| updated_by | INT(11) | FK to prog_user table | |
| active | TINYINT(1) | BOOLEAN, is active? | |

10. prog_content_associations

This associates a piece of content with a flow, row, or step. The type of content and how it relates to its associated flow, row, or step is defined in the prog_content_association_type table.
Fields:

| Name | Type | Description | Comments |
|---|---|---|---|
| id | INT(11) | PK | |
| type | INT(11) | FK on prog_content_association_type | not null |
| flow_id | INT(11) | FK on prog_flow | nullable |
| row_id | INT(11) | FK on prog_row | nullable |
| step_id | INT(11) | FK on prog_step | nullable |
| comment_id | INT(11) | FK to prog_comment | nullable |
| note_id | INT(11) | FK to prog_note | nullable |
| description | LONGTEXT | | nullable |
| content_id | INT(11) | FK to prog_content | |
| parameters | LONGTEXT | stores a JSON object with data relevant to content object | nullable |
| created | TIMESTAMP | the object's created date | |
| updated | TIMESTAMP | the object's date last modified | |
| created_by | INT(11) | FK to prog_user's | |
| updated_by | INT(11) | FK to prog_user table | |
| active | TINYINT(1) | BOOLEAN, is active? | |
| status | INT(11) | FK to status table | |

11. prog_content_association_types

This describes the possible types of content that can be associated with a particular flow, row, or step.
Fields:

| Name | Type | Description | Comments |
|---|---|---|---|
| id | INT(11) | PK | |
| name | TEXT | | |
| description | LONGTEXT | | nullable |
| type | TEXT | | |
| created | TIMESTAMP | the object's created date | |
| updated | TIMESTAMP | the object's date last modified | |
| created_by | INT(11) | FK to prog_user's | |
| updated_by | INT(11) | FK to prog_user table | |
| active | TINYINT(1) | BOOLEAN, is active? | |

12. prog_notes prog_note objects represent notes made on flows, rows, or steps.
Fields:

| Name | Type | Description | Comments |
|---|---|---|---|
| id | INT(11) | PK | |
| flow_id | INT(11) | FK on prog_flow | nullable |
| row_id | INT(11) | FK on prog_row | nullable |
| step_id | INT(11) | FK on prog_step | nullable |
| subject | TEXT | | nullable |
| content | LONGTEXT | | |
| created | TIMESTAMP | the object's created date | |
| updated | TIMESTAMP | the object's date last modified | |
| created_by | INT(11) | FK to prog_user's | |
| updated_by | INT(11) | FK to prog_user table | |
| active | TINYINT(1) | BOOLEAN, is active? | |
| status | INT(11) | FK to status table | |

13. prog_comments prog_comment objects represent comments made on flows, rows, or steps.
Fields:

| Name | Type | Description | Comments |
|---|---|---|---|
| id | INT(11) | PK | |
| flow_id | INT(11) | FK on prog_flow | nullable |
| step_id | INT(11) | FK on prog_step | nullable |
| row_id | INT(11) | FK on prog_row | nullable |
| subject | TEXT | | nullable |
| content | LONGTEXT | | |
| created | TIMESTAMP | the object's created date | |
| updated | TIMESTAMP | the object's date last modified | |
| created_by | INT(11) | FK to prog_user's | |
| updated_by | INT(11) | FK to prog_user table | |
| active | TINYINT(1) | BOOLEAN, is active? | |
| status | INT(11) | FK to status table | |

14. prog_milestones prog_milestone objects are created by the flow's author to be placed on the global progress flow timeline.

Fields:

| Name | Type | Description | Comments |
|---|---|---|---|
| id | INT(11) | PK | |
| flow_id | INT(11) | FK on prog_flow | |
| row_id | INT(11) | FK on prog_row | nullable |
| step_id | INT(11) | FK on prog_step | nullable |
| milestone_start_date | DATETIME | | nullable |
| milestone_end_date | DATETIME | | nullable |
| parameters | LONGTEXT | stores a JSON object with data relevant to content object | nullable |
| created | TIMESTAMP | the object's created date | |
| updated | TIMESTAMP | the object's date last modified | |
| created_by | INT(11) | FK to prog_user's | |
| updated_by | INT(11) | FK to prog_user table | |
| active | TINYINT(1) | BOOLEAN, is active? | |
| status | INT(11) | FK to status table | |

15. prog_collaborators prog_collaborator makes a user available for collaboration on a flow, row, or step. A user's entry in this table does not grant any particular level of access to a project by default, but makes them available for assignment to a flow, row, or step.

Fields:

| Name | Type | Description | Comments |
|---|---|---|---|
| id | INT(11) | PK | |
| flow_id | INT(11) | FK on prog_flow | |
| user_id | INT(11) | FK on prog_users | |
| role | IINT(1 | role/type of collaborator | |
| parameters | LONGTEXT | stores a JSON object with data relevant to content object | nullable |
| created | TIMESTAMP | the object's created date | |
| updated | TIMESTAMP | the object's date last modified | |
| created_by | INT(11) | FK to prog_user's | |
| updated_by | INT(11) | FK to prog_user table | |
| active | TINYINT(1) | BOOLEAN, is active? | |
| status | INT(11) | FK to status table | |

16. prog_collaborator_permissions prog_collaborator_permission stores the permissions for a collaborator on a row, step, or flow.

Fields:

| Name | Type | Description | Comments |
|---|---|---|---|
| id | INT(11) | PK | |
| collaborator_id | INT(11) | FK on prog_collaborator | |
| permission_id | INT(11) | FK on prog_permission | |
| flow_id | INT(11) | FK on prog_flow | |
| row_id | INT(11) | FK on prog_row | |
| step_id | INT(11) | FK on step_row | |
| parameters | LONGTEXT | stores a JSON object with data relevant to content object | nullable |
| created | TIMESTAMP | the object's created date | |
| updated | TIMESTAMP | the object's date last modified | |
| created_by | INT(11) | FK to prog_user's | |
| updated_by | INT(11) | FK to prog_user table | |
| active | TINYINT(1) | BOOLEAN, is active? | |
| status | INT(11) | FK to status table | |

17. prog_permissions

The permissions available to be assigned to a collaborator. Scope of permissions is determined by the type field: Flow, Row, Step Fields:

| Name | Type | Description | Comments |
|---|---|---|---|
| id | INT(11) | PK | |
| name | TEXT | | |
| description | LONGTEXT | | nullable |
| type | TEXT | | |
| created | TIMESTAMP | the object's created date | |
| updated | TIMESTAMP | the object's date last modified | |
| created_by | INT(11) | FK to prog_user's | |
| updated_by | INT(11) | FK to prog_user table | |
| active | TINYINT(1) | BOOLEAN, is active? | |

18. prog_statuses prog_status is a list of possible statuses for objects within the system.

Fields:

| Name | Type | Description | Comments |
|---|---|---|---|
| id | INT(11) | PK | |
| name | TEXT | | |
| description | LONGTEXT | | nullable |
| type | TEXT | User, Step, Flow, Row, General | |
| created | TIMESTAMP | the object's created date | |
| updated | TIMESTAMP | the object's date last modified | |
| created_by | INT(11) | FK to prog_user's | |
| updated_by | INT(11) | FK to prog_user table | |
| active | TINYINT(1) | BOOLEAN, is active? | |

19. prog_histories prog_history is the table that captures the audit trail for all objects within the system. All Fks are optional and nullable. One generic table stores all data related to all objects for now.

Fields:

| Name | Type | Description | Comments |
|---|---|---|---|
| id | INT(11) | PK | |
| flow_id | INT(11) | FK on prog_flow table | nullable |
| row_id | INT(11) | FK on prog_row table | nullable |
| step_id | INT(11) | FK on prog_step table | nullable |
| content_id | INT(11) | FK on prog_content table | nullable |
| comment_id | INT(11) | FK on prog_comment table | nullable |
| milestone_id | INT(11) | FK on prog_milestone table | nullable |
| note_id | INT(11) | FK on prog_note table | nullable |
| url_id | INT(11) | FK on prog_tiny_url table | nullable |
| api_key_id | INT(11) | FK on prog_api_key_table | nullable |

-continued

| Name | Type | Description | Comments |
| --- | --- | --- | --- |
| user_id | INT(11) | FK on prog_user table | nullable |
| organization_id | INT(11) | FK on prog_organization table | nullable |
| type | INT(11) | FK on prog_history_activity_type | |
| created | TIMESTAMP | the object's created date | |
| created_by | INT(11) | FK to prog_user's | |

20. prog_history_activity_types prog_history_activity_type is a list of activities that will be tracked by the systems audit trail system, in the prog_history table.
Fields:

| Name | Type | Description | Comments |
| --- | --- | --- | --- |
| id | INT(11) | PK | |
| name | TEXT | | |
| description | LONGTEXT | | nullable |
| created | TIMESTAMP | the object's created date | |
| updated | TIMESTAMP | the object's date last modified | |
| created_by | INT(11) | FK to prog_user's | |
| updated_by | INT(11) | FK to prog_user table | |
| active | TINYINT(1) | BOOLEAN, is active? | |

21. prog_tiny_urls prog_tiny_url associates an object in the system with a tiny url.
Fields:

| Name | Type | Description | Comments |
| --- | --- | --- | --- |
| id | INT(11) | PK | |
| flow_id | INT(11) | FK on prog_flow | nullable |
| row_id | INT(11) | FK on prog_row | nullable |
| step_id | INT(11) | FK on prog_step | nullable |
| content_id | INT(11) | FK on prog_content | nullable |
| parameters | LONGTEXT | stores a JSON object with data relevant to content object | nullable |
| created | TIMESTAMP | the object's created date | |
| updated | TIMESTAMP | the object's date last modified | |
| created_by | INT(11) | FK to prog_user's | |
| updated_by | INT(11) | FK to prog_user table | |
| active | TINYINT(1) | BOOLEAN, is active? | |
| status | INT(11) | FK to status table | |

22. prog_api_keys

This is an API key that will allow a user to display a flow in a widget.
Fields:

| Name | Type | Description | Comments |
| --- | --- | --- | --- |
| id | INT(11) | PK | |
| value | LONGTEXT | | |
| company_id | INT(11) | FK on prog_company | |
| parameters | LONGTEXT | stores a JSON object with data relevant to content object | nullable |
| created | TIMESTAMP | the object's created date | |
| updated | TIMESTAMP | the object's date last modified | |
| created_by | INT(11) | FK to prog_user's | |
| updated_by | INT(11) | FK to prog_user table | |
| active | TINYINT(1) | BOOLEAN, is active? | |
| status | INT(11) | FK to status table | |

23. prog_dependency_types

This table represents the types of dependencies that a step, row, or flow can have on another step, row, or flow. For the MVP, dependencies will only be allowed on steps.
Fields:

| Name | Type | Description | Comments |
| --- | --- | --- | --- |
| id | INT(11) | PK | |
| name | TEXT | | |
| description | LONGTEXT | | nullable |
| created | TIMESTAMP | the object's created date | |
| updated | TIMESTAMP | the object's date last modified | |
| created_by | INT(11) | FK to prog_user table | |
| updated_by | INT(11) | FK to prog_user table | |
| active | TINYINT(1) | BOOLEAN, is active? | |

24. prog_dependencies

This is a standard table with the base fields every table should have.
Fields:

| Name | Type | Description | Comments |
| --- | --- | --- | --- |
| id | INT(11) | PK | |
| dependency_type_id | INT(11) | FK on prog_dependency_types | |
| comments | LONGTEXT | | nullable |
| flow_id | INT(11) | FK on prog_flow | nullable |
| row_id | INT(11) | FK on prog_row | nullable |
| step_id | INT(11) | FK on step_row | nullable |
| parameters | LONGTEXT | stores a JSON object with data relevant to content object | nullable |
| created | TIMESTAMP | the object's created date | |
| updated | TIMESTAMP | the object's date last modified | |
| created_by | INT(11) | FK to prog_user's | |
| updated_by | INT(11) | FK to prog_user table | |
| active | TINYINT(1) | BOOLEAN, is active? | |
| status | INT(11) | FK to status table | |

Figure 19:
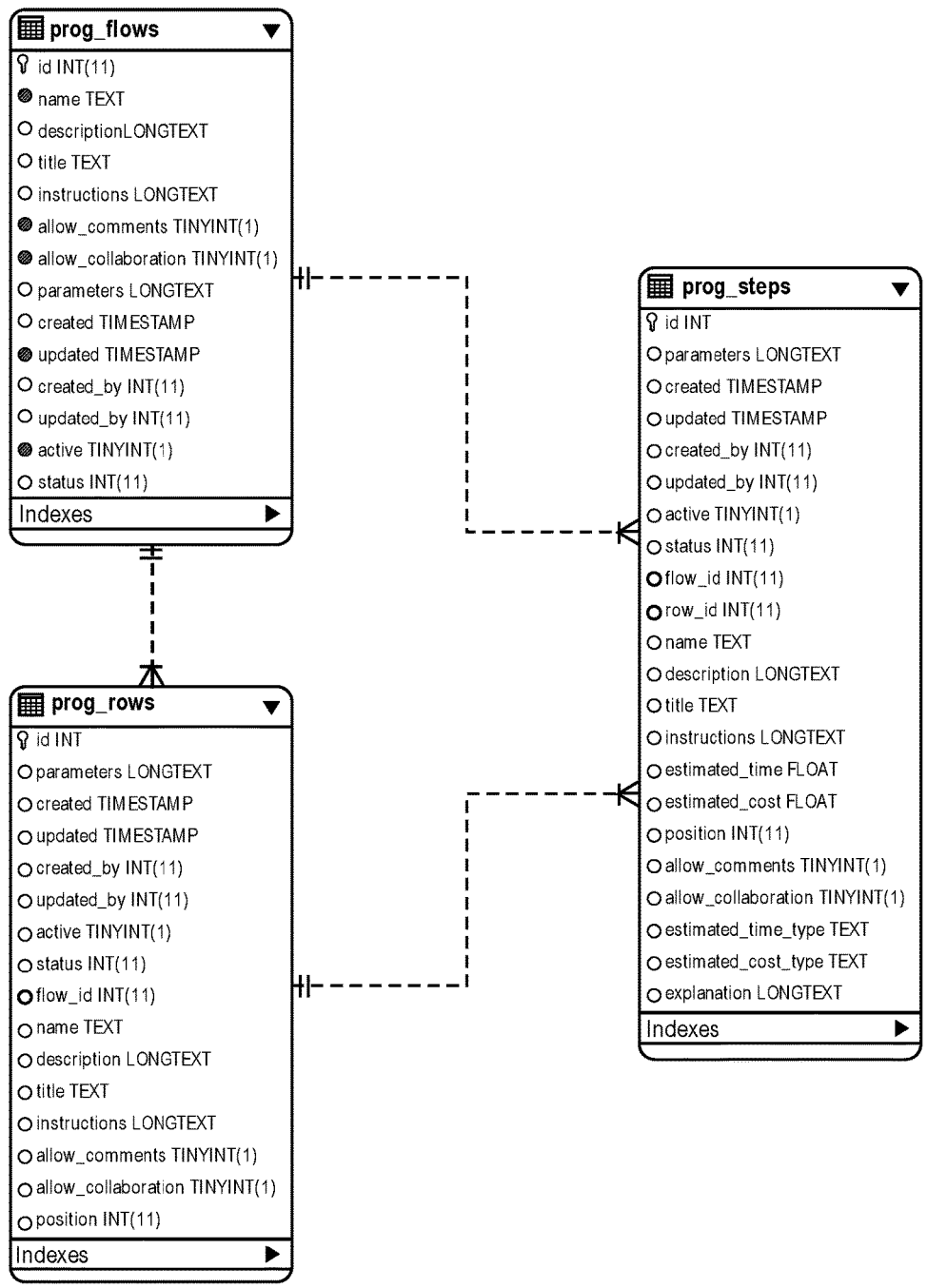
FIG. 19 is an entity relationship diagram showing a relationship between progress flows, rows and steps.
Figure 20:
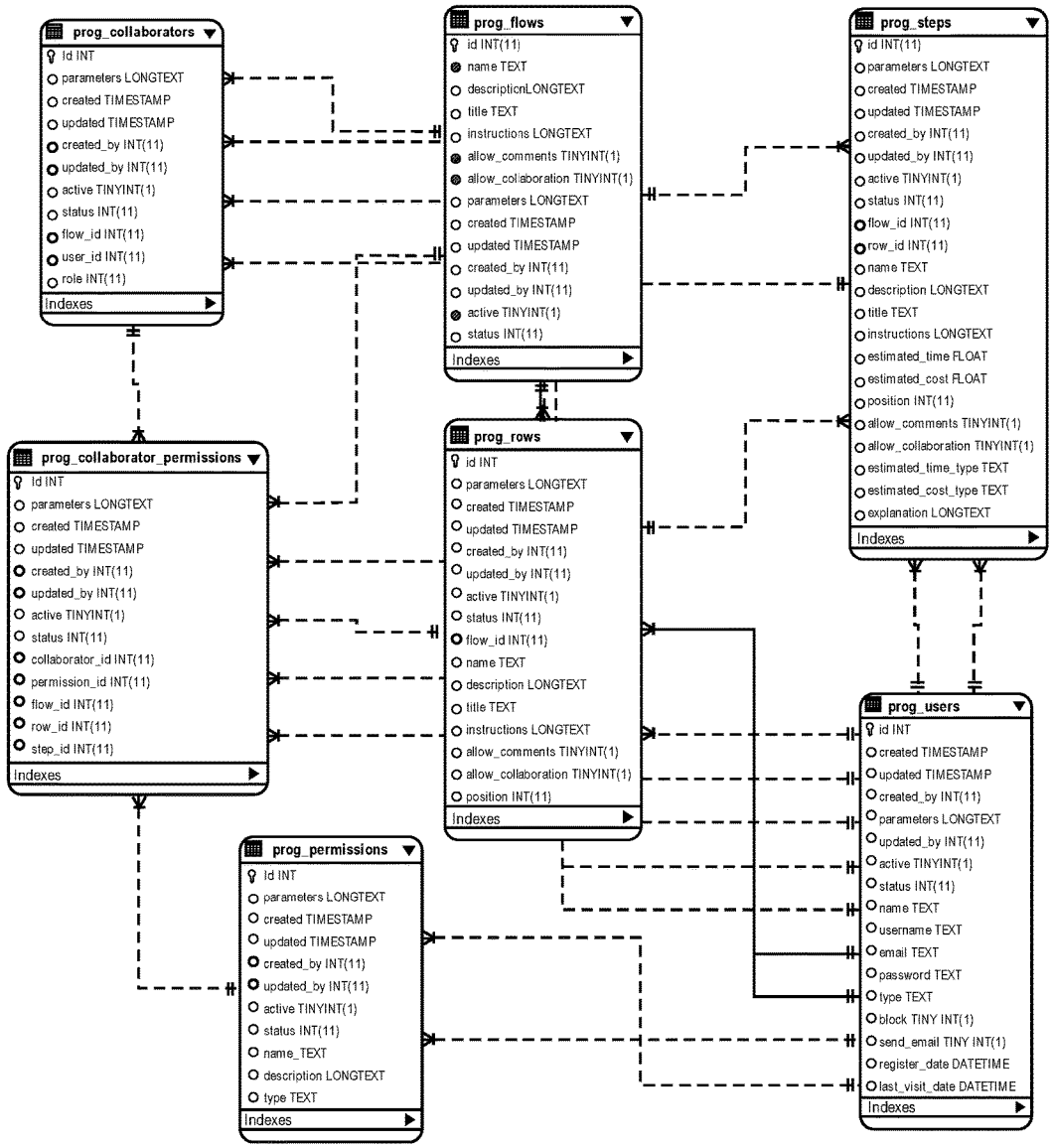
FIG. 20 is an entity relationship diagram showing a flow/row/step permissions model.
Figure 21:
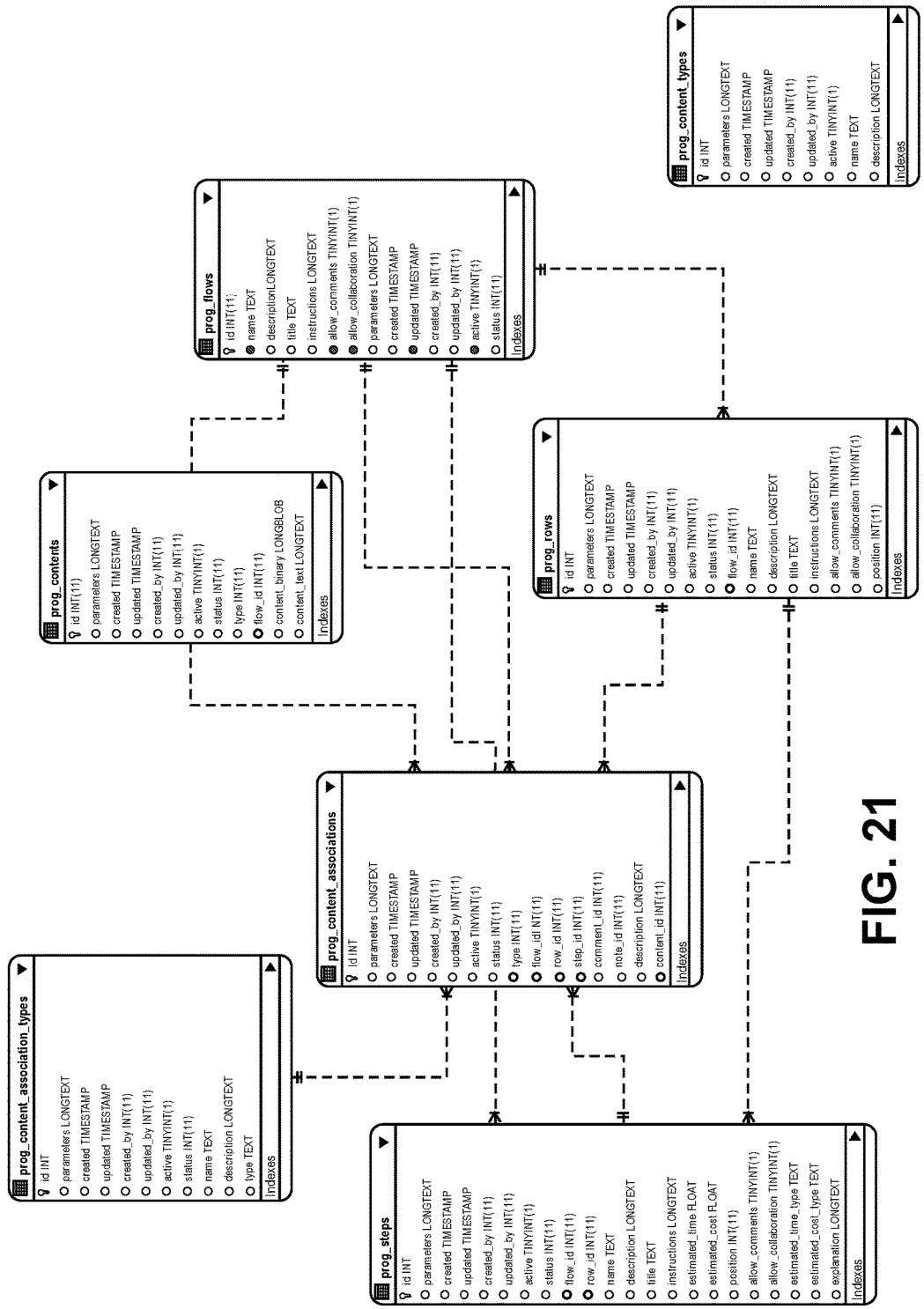
FIG. 21 is an entity relationship diagram showing flow/row/step content/media associations.

FIGS. 19 through 21 are entity relationship diagrams (using conventional Crow's Foot notation) showing examples of the relationships between certain ones of the software-implemented objects described above. In particular, FIG. 19 shows the relationship between progress flows (prog-flows), rows (prog_rows) and steps (prog_steps). FIG. 20 shows the flow/row/step permissions model. FIG. 21 shows the flow/row/step content/media associations.

Unless contrary to physical possibility, it is envisioned that (i) the methods/steps described herein may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
generating, in a processing system, information for providing a graphical user interface to a plurality of users using a plurality of processing devices on a network, to enable a first user of the plurality of users to create a graphical representation of a process, and to enable the plurality of users to view and edit the graphical representation of the process collaboratively via the network;
receiving, from at least one of the plurality of users, user input specifying progress made in performance of the process;
updating the graphical representation to indicate the progress visually, in response to the user input; and
enabling a user to assign roles and access privileges to other users in relation to the graphical representation of the process flow, by:
enabling the user to designate another user as a collaborator for the process flow, wherein a collaborator is an individual authorized to comment on and edit the graphical representation of the process flow; and
enabling the user to designate another user as an observer of the process flow, wherein an observer has more restricted access than a collaborator to the graphical representation of the process flow, wherein an observer is an individual authorized to comment on, but not edit, the graphical representation of the process flow.

2. A method as recited in claim 1, wherein the graphical representation comprises a timeline-based to-do list.

3. A method as recited in claim 1, wherein generating the graphical user interface comprises enabling the plurality of users to comment on the process by inputting comments on the graphical representation.

4. A method as recited in claim 1, wherein updating the graphical representation to indicate the progress comprises updating the graphical representation, based on the user input, to create visible distinctions between steps that have been completed, steps whose execution is in-progress, and steps whose execution has not yet begun.

5. A method as recited in claim 1, wherein updating the graphical representation to indicate the progress comprises updating the graphical representation based on the user input, to indicate when and by whom a particular step was completed.

6. A method as recited in claim 1, further comprising:
enabling a user to associate a resource with a step in the process, by user input directed to the graphical representation.

7. A method as recited in claim 6, wherein the resource comprises at least one of: a document, a hyperlink, a graphical object, a still image, an audio clip or a video clip.

8. A method as recited in claim 1, further comprising:
providing, in each said displayable object, a data input field designated to receive user input specifying instructions, to be displayed to one or more of the users, on how to perform the corresponding step;
receiving first user input from a first user, the first user input directed to the first field in one of the displayable objects that represents a corresponding one of the steps, the first user input specifying instructions on how to perform said one of the steps;
associating the instructions with said one of the steps in response to the first user input;
receiving second user input from a second user, the second user input being directed to said one of the visual objects; and
in response to second user input, causing the instructions to be displayed to the second user.

9. A method as recited in claim 1, wherein generating a graphical representation of the process flow further comprises visually indicating a present point in time in relation to the process flow.

10. A method as recited in claim 1, wherein generating a graphical representation of the process flow further comprises providing an interface by which a user can specify a dependency of a step in the process flow upon another step in the process flow.

11. A method as recited in claim 1, further comprising enabling a user to provide input to assign a step in the process flow to another user and specify at least one of: a date by which progress is to be shown on the step or a date by which the step is to be completed.

12. A method as recited in claim 11, further comprising at least one of:

automatically sending a notification to a particular user to whom a step has been assigned in response to the step being assigned to said particular user; or automatically sending a notification to a particular user to whom a step has been assigned at a predetermined amount of time prior to a specified date by which progress is to be shown on the step or a specified date by which the step is to be completed.

13. A method comprising:

transmitting, over a network, information for providing a graphical user interface to each of a plurality of users, each of whom uses a separate one of a plurality of processing devices;

receiving, at a server via the network, user inputs provided by use of the graphical user interface, the user inputs specifying a plurality of steps that form a process flow in the form of a plurality of displayable objects, each said displayable object representing a separate one of the plurality of steps;

in response to the user inputs, generating a graphical representation of the process flow at the server, the graphical representation including the plurality of displayable objects, wherein the plurality of displayable objects are linked to each other visually in a manner indicative of an intended sequence of the plurality of steps;

enabling the plurality of users to view and edit the graphical representation of the process collaboratively via the network;

receiving, from at least one of the plurality of users, user input indicating progress made in performance of the process;

in response to the user input, modifying the graphical representation to indicate the progress visually; and enabling a user to assign roles and access privileges to other users in relation to the graphical representation of the process flow, by:

enabling the user to designate another user as a collaborator for the process flow, wherein a collaborator is an individual authorized to comment on and edit the graphical representation of the process flow; and enabling the user to designate another user as an observer of the process flow, wherein an observer has more restricted access than a collaborator to the graphical representation of the process flow, wherein an observer is an individual authorized to comment on, but not edit, the graphical representation of the process flow.

14. A method as recited in claim 13, wherein the graphical representation comprises a timeline-based to-do list.

15. A method as recited in claim 13, wherein said modifying the graphical representation to indicate the progress comprises updating the graphical representation, based on the user input, to create visible distinctions between steps that have been completed, steps whose execution is in-progress, and steps whose execution has not yet begun.

16. A method as recited in claim 13, wherein said modifying the graphical representation to indicate the progress comprises updating the graphical representation based on the user input, to indicate when and by whom a particular step was completed.

17. A method as recited in claim 13, further comprising:
enabling a user to associate a resource with a step in the process, by user input directed to the graphical representation, wherein the resource comprises at least one of: a document, a hyperlink, a graphical object, a still image, an audio clip or a video clip.

18. A method as recited in claim 13, further comprising:
providing, in each said displayable object, a data input field designated to receive user input specifying instructions, to be displayed to one or more of the users, on how to perform the corresponding step;

receiving first user input from a first user, the first user input directed to the first field in one of the displayable objects that represents a corresponding one of the steps, the first user input specifying instructions on how to perform said one of the steps;

associating the instructions with said one of the steps in response to the first user input;

receiving second user input from a second user, the second user input being directed to said one of the visual objects; and in response to second user input, causing the instructions to be displayed to the second user.

19. A method as recited in claim 13, wherein generating a graphical representation of the process flow further comprises visually indicating a present point in time in relation to the process flow.

20. A method as recited in claim 13, wherein generating a graphical representation of the process flow further comprises providing an interface by which a user can specify a dependency of a step in the process flow upon another step in the process flow.

21. A method as recited in claim 13, further comprising enabling a user to provide input to assign a step in the process flow to another user and specify at least one of: a date by which progress is to be shown on the step or a date by which the step is to be completed.

22. A non-transitory machine-readable storage medium storing instructions that, when executed by a machine, cause the machine to perform a process that comprises:

generating, in a processing system, information for providing a graphical user interface to a plurality of users using a plurality of processing devices on a network, to enable a first user of the plurality of users to create a graphical representation of a process, and to enable the plurality of users to view and edit the graphical representation of the process collaboratively via the network;

receiving, from at least one of the plurality of users, user input specifying progress made in performance of the process;

updating the graphical representation to indicate the progress visually, in response to the user input; and enabling a user to assign roles and access privileges to other users in relation to the graphical representation of the process flow, by:

enabling the user to designate another user as a collaborator for the process flow, wherein a collaborator is an individual authorized to comment on and edit the graphical representation of the process flow; and enabling the user to designate another user as an observer of the process flow, wherein an observer has more restricted access than a collaborator to the graphical representation of the process flow, wherein an observer is an individual authorized to comment on, but not edit, the graphical representation of the process flow.

23. A processing system comprising:
a communications interface through which to communicate with a plurality of remote processing devices, each associated with a separate one of a plurality of users;
a memory; and
a processor coupled to the communications interface and the memory and configured to execute operations that include transmitting information for providing a graphical user interface to each of the plurality of remote processing devices;

receiving user inputs provided by use of the graphical interface, the user inputs specifying a plurality of steps that form a process flow in the form of a plurality of displayable objects, each said displayable object representing a separate one of the plurality of steps;

in response to the user inputs, generating a graphical representation of the process flow at the server, the graphical representation including the plurality of displayable objects, wherein the plurality of displayable objects are linked to each other visually in a manner indicative of an intended sequence of the plurality of steps;

enabling the plurality of users to view and edit the graphical representation of the process collaboratively;

receiving, from at least one of the plurality of users, user input indicating progress made in performance of the process;

in response to the user input, modifying the graphical representation to indicate the progress visually; and enabling a user to assign roles and access privileges to other users in relation to the graphical representation of the process flow, by:

enabling the user to designate another user as a collaborator for the process flow, wherein a collaborator is an individual authorized to comment on and edit the graphical representation of the process flow; and enabling the user to designate another user as an observer of the process flow, wherein an observer has more restricted access than a collaborator to the graphical representation of the process flow, wherein an observer is an individual authorized to comment on, but not edit, the graphical representation of the process flow.

* * * * *